Oct. 2, 1962 C. KLEESATTEL ET AL 3,056,698
METHOD AND APPARATUS FOR CLEANING POROUS OBJECTS
Filed Nov. 2, 1959 7 Sheets-Sheet 7
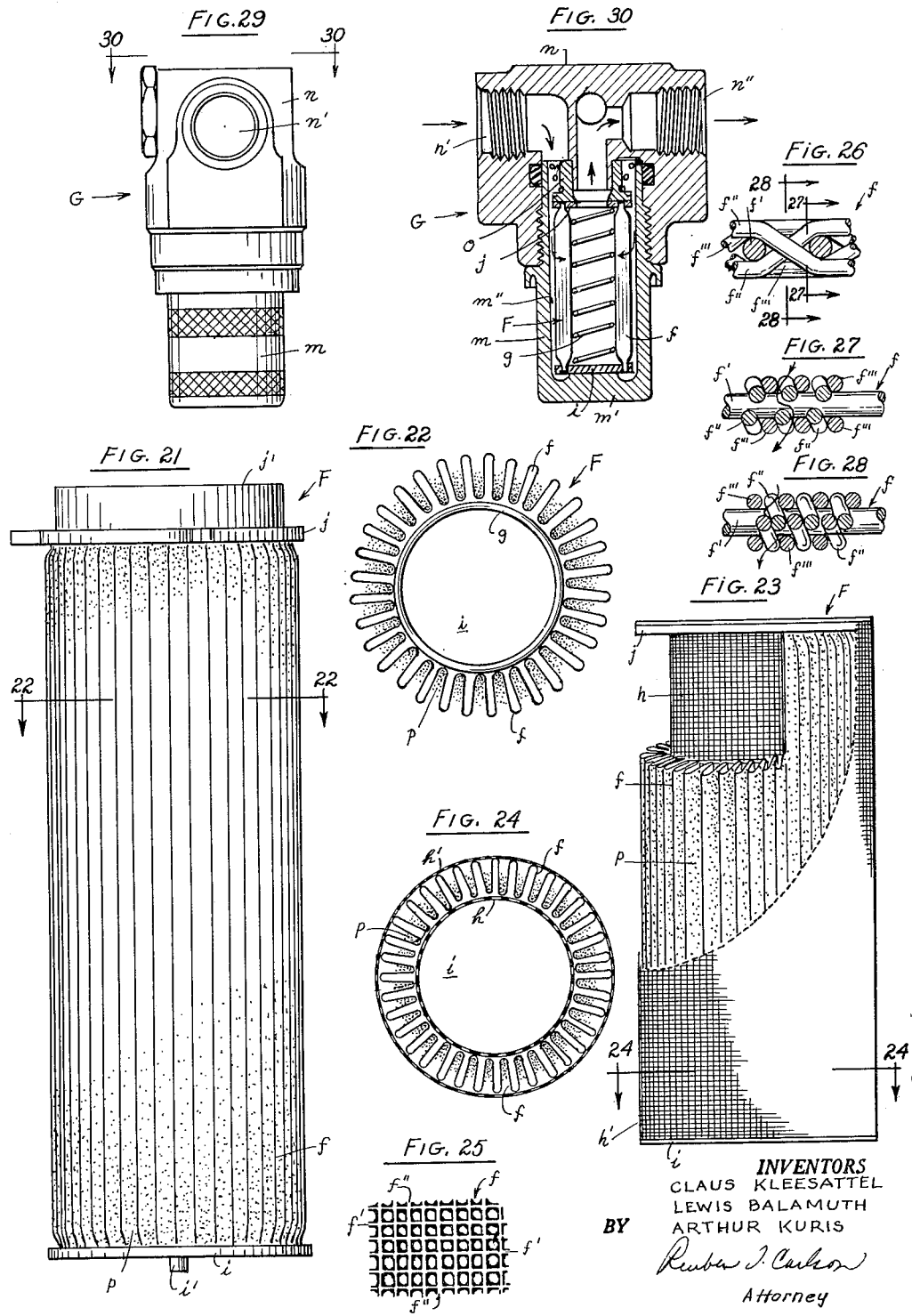

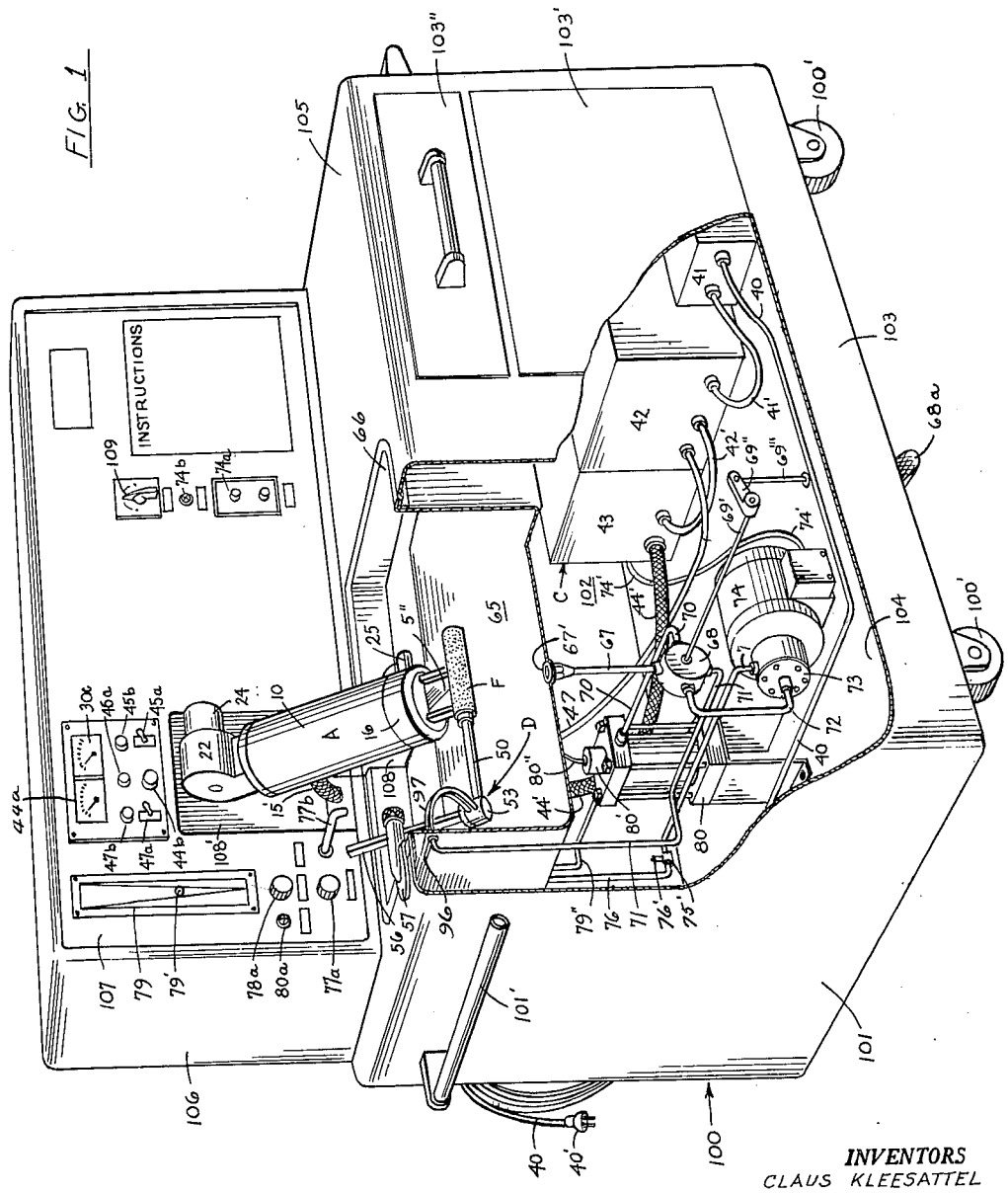

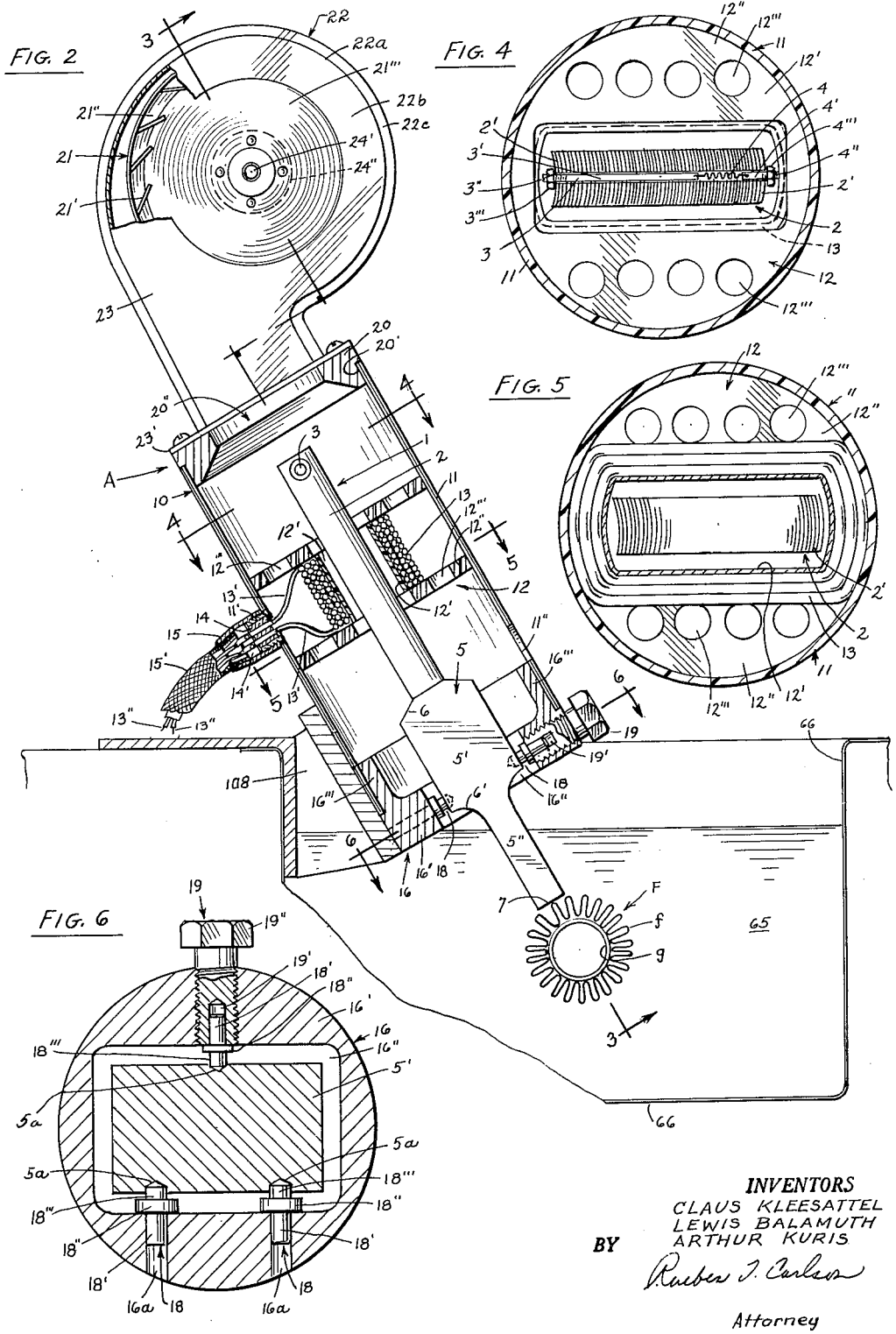

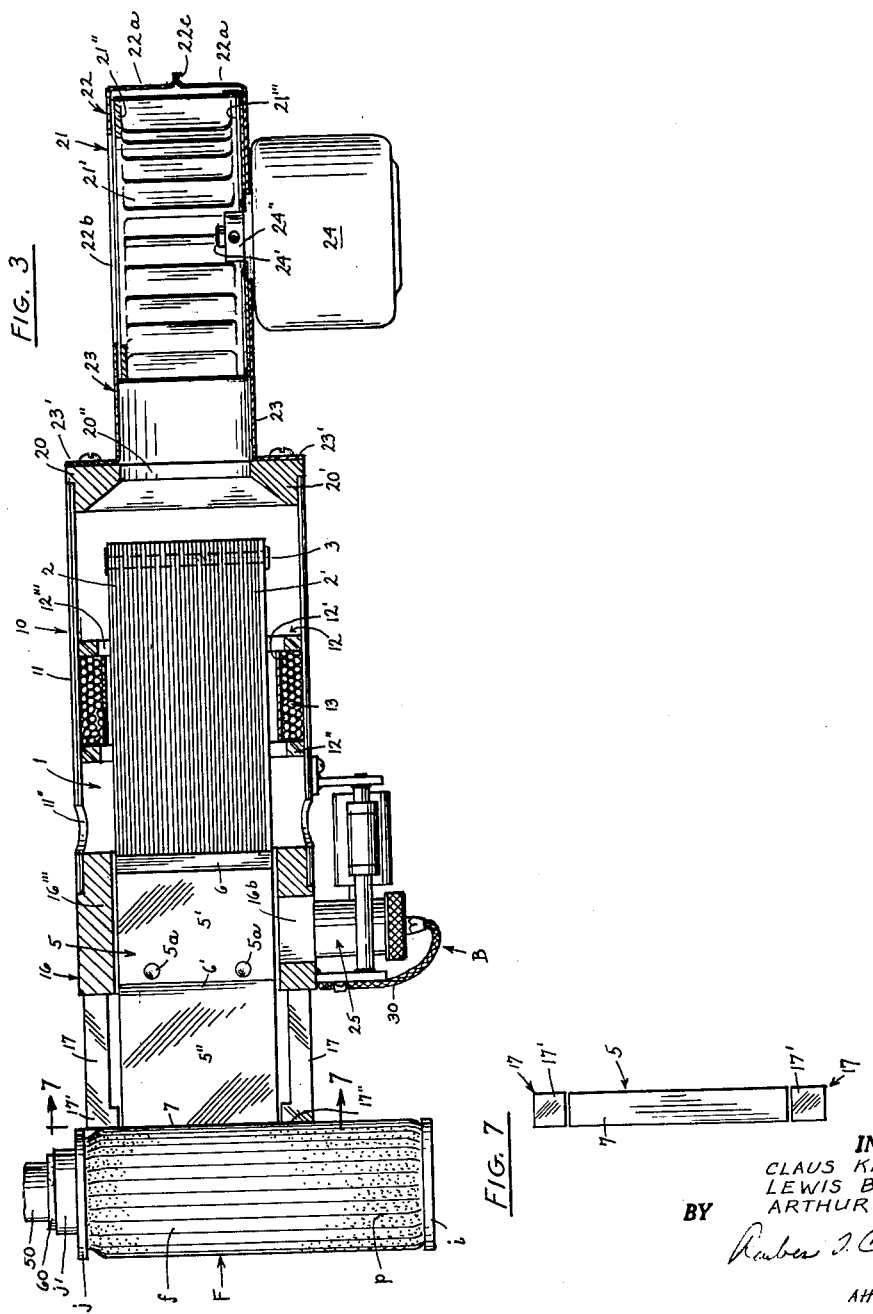

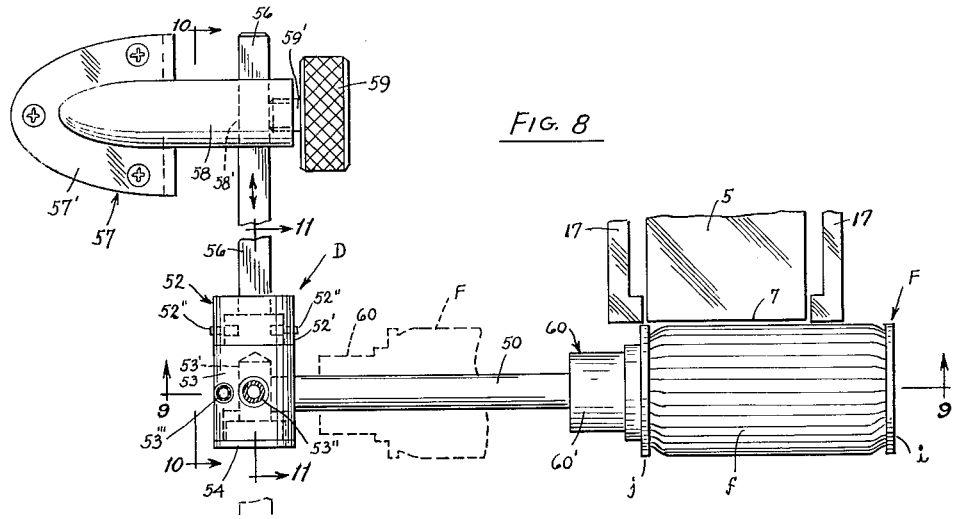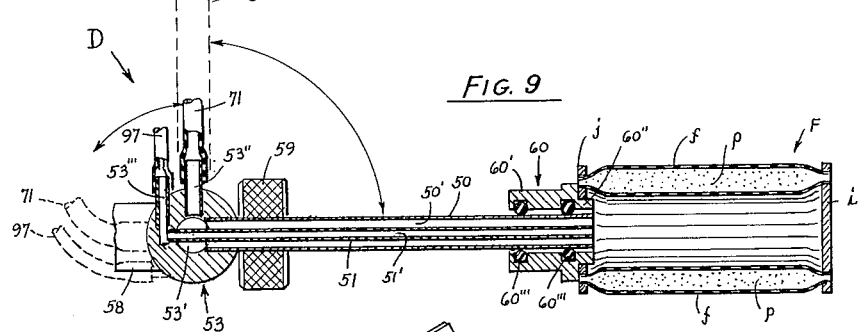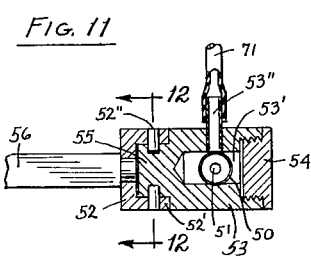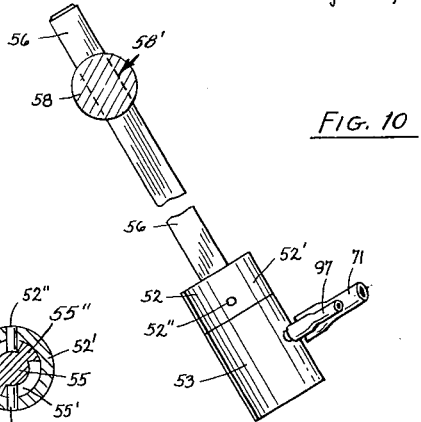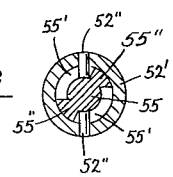

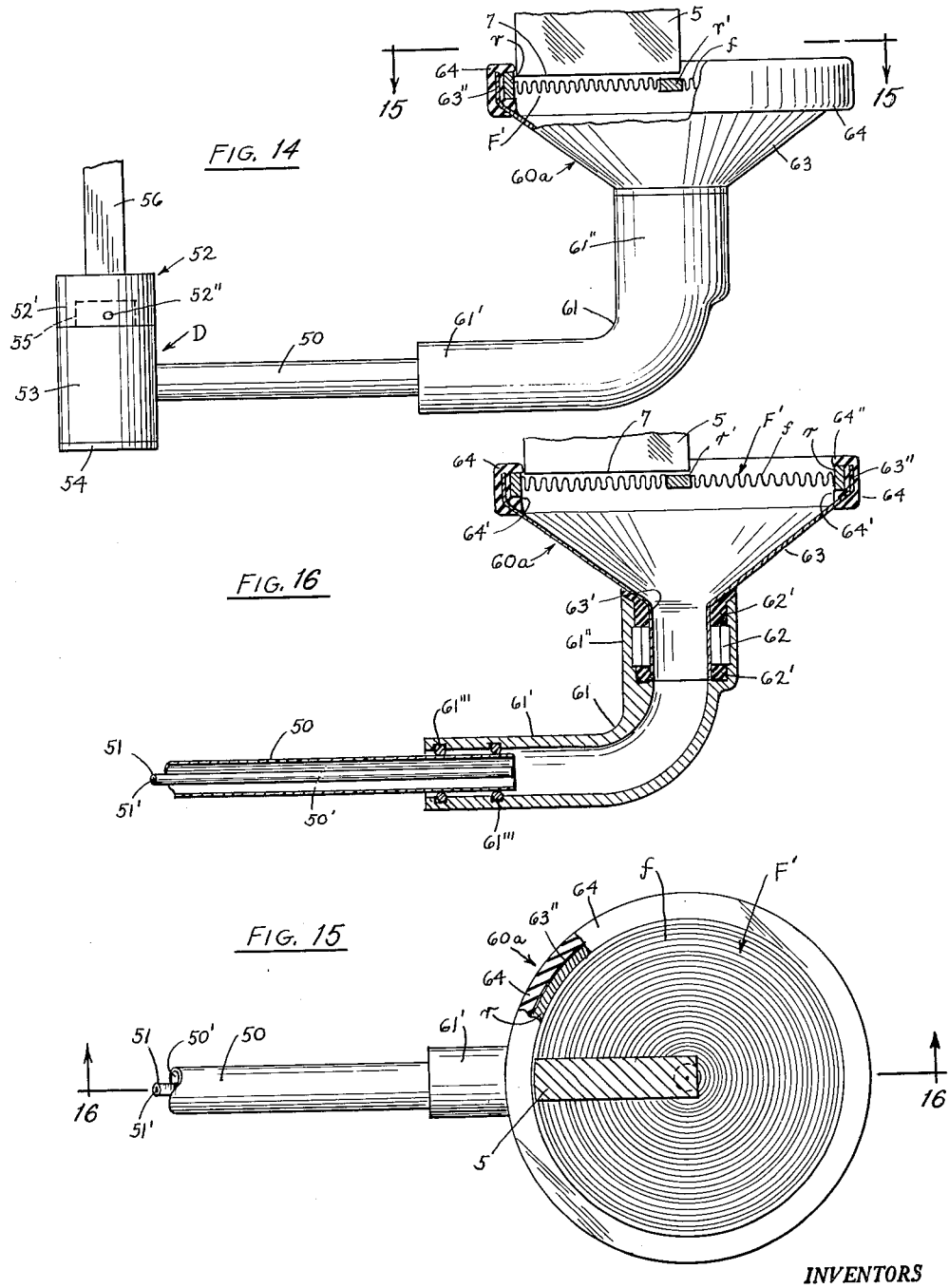

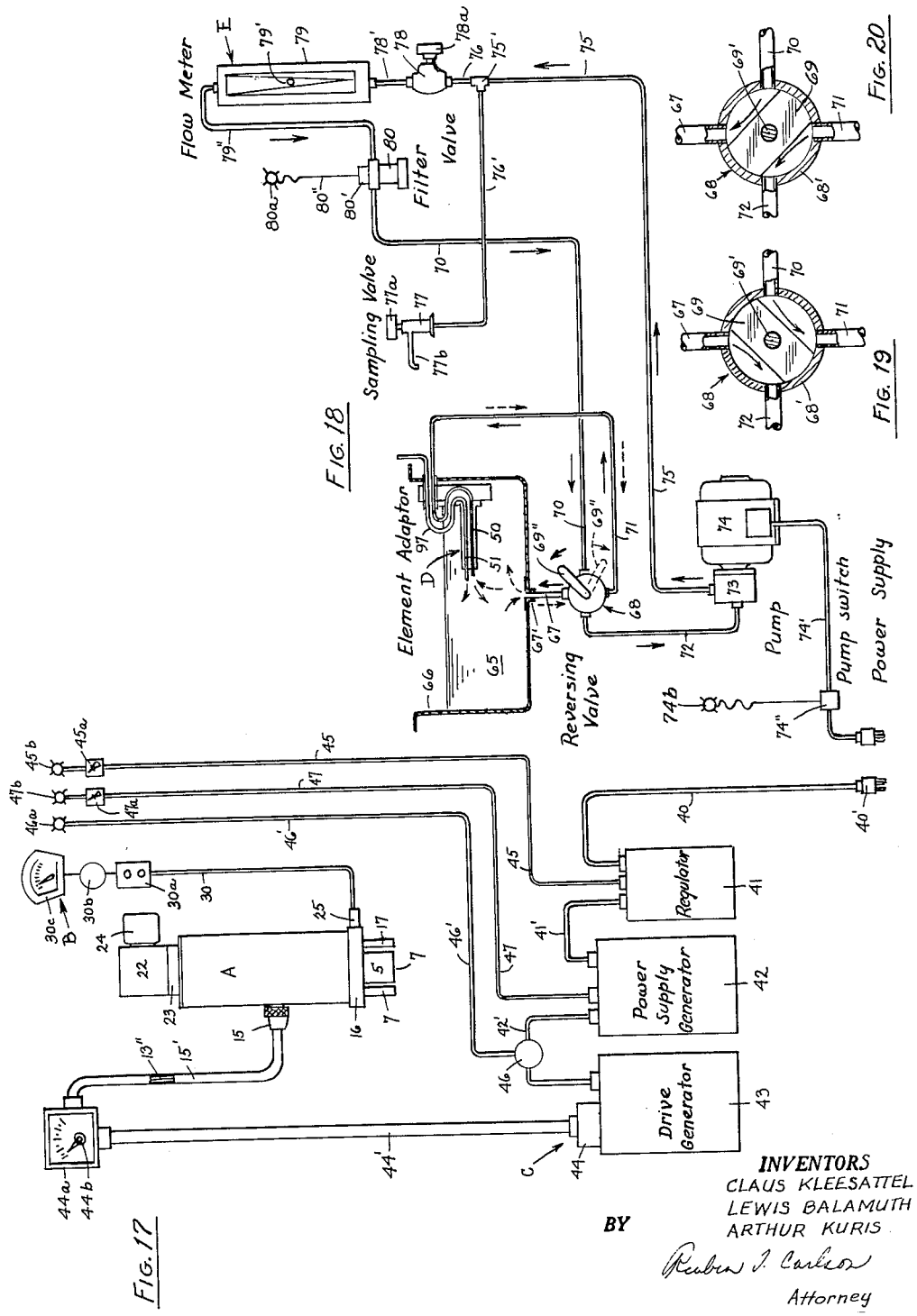

:::::: {.columns}
::: {.column}
United States Patent Office 3,056,698
Patented Oct. 2, 1962

3,056,698
METHOD AND APPARATUS FOR CLEANING POROUS OBJECTS
Claus Kleesattel, Forest Hills, Lewis Balamuth, Woodside, and Arthur Kuris, Riverdale, N.Y., assignors to Cavitron Ultrasonics Inc., a corporation of New York
Filed Nov. 2, 1959, Ser. No. 850,406
40 Claims. (Cl. 134—1)

This invention relates to a method and apparatus for cleaning porous objects, and more particularly to an improved method and apparatus for removing particle debris which has become entrained in the minute pores of the filtering element of a used filter unit and to recondition the filter unit for satisfactory re-use.

Various types and kinds of filtering screens and fabrics have been used to remove particle debris from gaseous or liquid streams in oil refining, in the manufacture of chemical and pharmaceutical products, and in hydraulic pressure systems. While the filter cleaning method and apparatus of this invention has wide application to the rapid and thorough removal of pore clogging debris from numerous types and kinds of filters and filtering elements composed of various materials of selective porosity, this invention has particular application to the cleaning and removal of particle debris from woven screen or fabric filters whose filtering pores are microscopic in size and in the order of ten microns or less, and which are particularly difficult to clean and condition for re-use, except by the method and apparatus of this invention.

One type of filter unit which is highly efficient but is particularly difficult to clean is a filter unit whose filtering element is formed from extremely small and high tensile strength metal or plastic threads or filaments, which are interwoven and bonded together at their crossing points to provide a woven screen or fabric which presents minute but uniform sized pores so small that they are not discernible to the naked eye and can only be seen through a microscope. After weaving this filter screen to provide minute pores of micron size, the screen is rumpled or corrugated to increase the filtering surface and strengthen the filtering screen. This corrugated screen may then be welded or bonded into tubular form, and an end closure disc and an end ring may then be welded or bonded to the opposite ends of the corrugated filtering tube to provide a tubular filter unit which may be positioned in the filtering supporting cell forming a part of a liquid or gaseous flow system. Alternatively, the outer periphery of the corrugated filtering screen may be welded or bonded to a supporting rim to provide a relatively flat or cup-shaped filtering unit, one or more of which may be positioned in a filter supporting cell forming a part of a liquid or gaseous flow system.

The debris contaminated gaseous or liquid stream is supplied under pressure to one side of the corrugated filtering screen or element, resulting in the deposition of particle debris on the filtering screen, while cleaned and purified gas or liquid emerges from the opposite side of the filtering element and is then returned to the flow system.

Various forms of filter units having filtering screens of this type are ideally adapted for removal of particle debris from hydraulic fluids circulating in hydraulic systems working at extremely high pressures. Such high pressure hydraulic systems are extensively used, for example, in jet engined aircraft for the manipulation of the landing gear, ailerons and the like, and whose hydraulic pumps, compressors, valves, tubing and like components are made to extremely close tolerances to withstand very high pressure so that they can be made small in size and light in weight. High pressure hydraulic systems require the use of highly clean and purified hydraulic liquids, and the prompt removal from the hydraulic liquid of all minute metal particles and debris therefrom, since the presence of particle debris in the hydraulic stream will cause excessive wear of working components and is likely to cause a pressure drop in the system and jamming or freezing of moving parts. Because of their high filtering effectiveness and efficiency, resistance to corrosion, high filtering capacity, small resistance to fluid flow, and reliability in use, filter units having corrugated filtering elements formed from tightly woven screen or fabric and presenting extremely small filtering pores of the type above described, are extensively used at critical locations in high pressure hydraulic systems.

However, filtering screens of the type above described, require periodic cleaning after use in high pressure systems. Since these filtering screens cannot be cleaned while in situ in a high pressure system, they must be periodically removed from the system for cleaning treatment. Brush scrubbing of the filtering screen is not a satisfactory cleaning method, since this method will not effectively remove impacted debris from its filtering pores. Accordingly, present cleaning methods involve the immersion of the filtering screen in a boiling caustic solution. The boiling caustic method of cleaning these filtering screens presents serious health hazards to the cleaning operator, often corrodes and damages parts of the filter unit, and requires such specilized equipment and skill that the cleaning operation can only be properly performed in a plant equipped for the purpose. Immersion of the filter unit in a bath or tank of cleaning fluid whose bottom wall is subjected to high frequency vibration to thereby agitate a large volume of the fluid bath, has also been attempted, but found to be ineffective and unsatisfactory, since this procedure removes only a small fraction of the particle debris entrained in its filtering screen, and will not properly recondition its filtering screen for re-use.

Filter units whose filtering element presents filtering pores of microscopic size and therefore are difficult to clean by methods and procedures heretofore used, can be thoroughly and effectively cleaned in minimum time by a relatively unskilled operator by the practice of this invention. In accordance with this invention, the filter unit is immersed in a bath of relatively mild cleaning fluid which is a solvent for oils and greases, which has no corrosive effect on the metal parts from which the filter unit is made, which is substantially free of entrained water, and which is compatible with the fluid or gas from which the particle debris, entrained in its filtering screen, has been recovered.

The method and apparatus of this invention embraces the use of a vibrator assembly containing a vibrator unit vibrated at ultrasonic frequencies in the order of five to fifty thousand cycles per second, and which is mounted to present its vibrator working face in minutely spaced relation to one surface of the filtering screen of the immersed filter unit to be cleaned, and may be so maintained by bracing struts or legs associated with the vibrator assembly which seat against the exterior surface of the filtering screen. The close proximity to which the vibrating working face of the vibrator assembly is positioned with respect to the adjacent surface of the immersed filtering screen, produces hyper-intense cavitation of a limited column of cleaning fluid, covering an area directly under and immediately adjacent the vibrating working face of the vibrator assembly, and which extends to a depth which is greater than the thickness of the filtering screen to be cleaned.

Means are additionally provided for applying pressurized cleaning fluid to one surface of the filtering element of the filtering unit which exerts an outwardly di-
:::
::::::

rected pushing force on the particle debris which clogs the filtering pores, and which is applied during vibration at ultrasonic frequencies of the working face of the vibrator assembly positioned immediately adjacent the opposite surface of the filtering element. The hyper-intense cavitation of the limited column of cleaning fluid which extends through the filtering element and from one side to the opposite side thereof, creates hyper-intense and localized disruption of the cleaning fluid of such force as to loosen the entrained debris particles from its enmeshed position in the pores of the corrugated filtering screen, and which cavitational loosening force is further augmented by the opposite pushing force exerted by the fluid pressure applied to the opposite surface of the filtering screen. As a result of the loosening forces produced by hyper-intense cavitational action at the cleaning site area of the filtering element, together with fluid pressure pushing forces applied to the opposite surface of the filtering element, from seventy-five to ninety percent of the entrained particle debris is loosened and pushed out from the filtering pores in a direction towards the working face of the vibrating assembly in this first stage of the cleaning operation. During this first stage of the cleaning operation, the filtering screen is moved and manipulated to present progressive cleaning site areas thereof in adjacent relation to the vibrating working face of the vibrator assembly, until the entire surface area of the filtering screen has been scanned by the vibrating working face of the vibrator assembly.

Second stage and final cleaning of the corrugated filtering screen is accomplished by continuing the hyper-intense cavitation of the localized column of the cleaning fluid extending through the filtering screen from one side to the opposite side thereof, as generated by the vibrating working face of the vibrator assembly positioned closely adjacent one surface of the filtering element, and simultaneously applying a fluid suction to the opposite surface of the filtering screen, to thereby produce a loosening and inward removal of remaining particle debris which has not been outwardly removed during the first stage of the cleaning operation. In this second stage of the cleaning operation, the hyper-intense cavitation of the localized column of cleaning fluid as engendered by the vibrating working face of the vibrator assembly, exerts a loosening force on the remaining debris particles, which is augmented and enhanced by the suction or pulling force exerted on the debris particles by the fluid suction applied to the opposite surface of the filtering screen. During this second stage of the cleaning operation, the filtering screen is moved across the vibrating working face of the vibrator assembly to present progressive cleaning site areas to the combined forces of hyper-intense cavitation and suction, until the filtering screen has been fully cleaned over all areas thereof.

The filter unit may be slidably mounted on one end of a cleaning fluid tube immersed in the cleaning fluid bath, and connected to a reversible pressure and suction system through which cleaning fluid is circulated under control of the operator. The cleaning fluid circulation system may incorporate a two-way-reversing valve which can be conveniently adjusted by the operator to apply either fluid pressure or fluid suction to one side of the immersed filtering screen, while the opposite side of the filtering screen is subjected to the hyper-intense cavitation of a localized column of cleaning fluid as engendered by the working face of the vibrator assembly applied to the opposite side of the filtering screen. In the first stage cleaning operation, the two-way reversing valve is adjusted so that the cleaning fluid circulation system applies cleaning fluid under controlled pressure to one side of the corrugated filtering screen to assist in pushing particle debris from the pores thereof in an outward direction, while a localized column of cleaning fluid is subjected to hyper-intense cavitation as engendered by the vibrating working face of the vibrator assembly positioned directly adjacent the opposite surface of the filtering screen. During this first stage of the cleaning operation, the immersed tubular filtering screen is manually or mechanically rotated and longitudinally reciprocated to present progressive cleaning site areas thereof to the working face of the vibrator assembly while cleaning fluid pressure is applied to the opposite surface of the filtering screen. After all exterior surface areas of the tubular filtering screen have been fully scanned by the vibrating working face of the vibrator assembly, the second and final stage of the cleaning operation can proceed without halting the vibration of the working face of the vibrator assembly, or removing the immersed filtering screen from its supported position in the cleaning fluid.

In the second and final stage of the cleaning operation, the two-way reversing valve is adjusted by the operator to apply fluid suction to one side of the immersed filtering screen, while the opposite side of the filtering screen is subjected to the hyper-intense cavitation of a localized column of cleaning fluid as engendered by the working face of the vibrator assembly applied to the opposite side of the filtering screen. During this second cleaning stage, the filtering screen is manually or mechanically manipulated on the cleaning fluid tube which supports it, until the filtering screen of the filter unit has again been fully scanned by the vibrating working face of the vibrator assembly.

The apparatus of this invention also embraces an improved acoustical vibrator assembly of high operating efficiency, and which includes a vibrator unit composed of a magnetostrictive transducer section bonded to a connecting body designed to operate as an acoustical impedance transformer. The magnetostrictive transducer section is composed of a compact stack of relatively thin magnetostrictive metal plates or laminates of generally arcuate shape and whose concavo-convex curvature is not substantially more than sixty degrees, and preferably in the range of approximately twenty-five degrees to forty-five degrees. By making the magnetostrictive laminates which compose the stack of identical shape and form and of limited concavo-convex curvature, the laminates can be compactly stacked with substantially no gap therebetween, and yet can be made relatively thin so that the applied magnetic flux penetrates the laminates to a substantial degree, and yet of sufficient stiffness so that the laminates will not bend when longitudinally vibrated at the operating frequency. The relatively thin arcuately shaped magnetostrictive laminates have the same physical length when compactly assembled in the stacked relation, and which length conforms to one-half wavelength or an integral multiple number of half wavelengths of sound traveling longitudinally through the magnetostrictive laminates at the operating frequencey. The stacked laminates are also held in compactly stacked relation by a clamping device so formed and applied that the device does not impede the longitudinal vibration of the laminates which compose the stack.

One end of each of the compactly stacked laminates is rigidly bonded to one end of a connecting body designed to operate as an acoustical impedance transformer so that the output end thereof vibrates at a substantially greater amplitude than the input end thereof where the vibrations are injected by the energized magnetostrictive transducer stack. The output end of the connecting body presents an end face which may be used to vibrate or cavitate liquids, or as is generally known in the art, may have a work tool fixed thereto for boring, cutting or chipping hard materials, with or without the use of abrasive slurries. The connecting body has a physical length corresponding to one-half wavelength or an integral multiple number of one-half wavelengths of sound traveling through the connecting body at the frequency of vibration injected into the input end thereof.

The magnetostrictive transducer stack and a section of the connecting body are designed to be removably inserted into a casing or housing which contains an energizing coil supported on a suitable spool contained within the casing, and through which the magnetostrictive transducer section is telescoped. The vibrator unit is supported by a collar fixed to one end of the casing and which is provided with clamp studs designed to releasably grip the connecting body at approximately a nodal area thereof. The energizing coil is supplied with biased alternating current which establishes an alternating magnetic field at and in adjacent relation to a nodal area of the magnetostrictive transducer section. The alternating magnetic field thus established has a frequency within the range of the resonance frequency of vibration for which the magnetostrictive transducer stack is designed. A cooling or blower fan is fixed to the opposite end of the casing or housing to supply a stream of cooling air in surrounding relation to the magnetostrictive transducer stack, and the side walls of the casing adjacent the opposite end thereof are provided with suitable port holes through which the warmed air is ejected.

The apparatus of this invention also embraces a power generating circuit for the generation of biased alternating current of controlled frequency for energizing and driving the vibrator unit of the vibrator assembly. Means within the convenient reach of the operator, are also provided for tuning the biased alternating current generator system to a controlled cyclic frequency which will result in optimum resonant vibrating performance of the vibrator unit, and insure the most effective hyper-intense cavitation of the localized column of cleaning fluid extending through the filtering screen of the filter unit, and over a limited cleaning site area thereof.

Filter units having a corrugated filtering current formed from interwoven high tensile strength threads or filaments and presenting filtering pores of microscopic size, can be effectively and thoroughly cleaned by a relatively unskilled operator in five to ten minutes, when the method and apparatus of this invention is used. All components of the apparatus may be contained within or mounted upon a cabinet which is no longer than a small kitchen range or stove. The cabinet, containing or accessibly supporting all the components of this apparatus, may be mounted on rollers so that it can be conveniently moved and used at any desired location.

Filter unit cleaning apparatus made in accordance with this invention is ideally adapted for use at air field hangars where planes are often grounded because of malfunctioning of their hydraulic systems, often caused by clogged filters. When this apparatus is located at an air field hangar, clogged filters can be removed and cleaned at the air field where the plane is grounded, thereby avoiding the costly delays of shipping the filters to a distant cleaning plant, as is presently practiced. Since a relatively mild cleaning fluid, such a high grade kerosene, can be used to provide the cleaning bath, the health hazards and corrosion problems characteristic of cleaning solutions and cleaning methods heretofore used, are eliminated.

Other objects and advantages of this invention will become apparent as the disclosure proceeds.

Although the characteristic features of this invention will be particularly pointed out in the claims, the invention itself, and the manner in which it may be made and used, may be better understood by referring to the following description taken in connection with the accompanying drawings forming a part hereof, in which:

FIG. 1 is a perspective view of one form of filter cleaning apparatus constructed in accordance with this invention, certain parts of its cabinet walls being broken away to reveal some of the apparatus components contained therein;

FIG. 2 is a longitudinal section of the vibrator assembly mounted in operative relation to a tubular filter unit to be processed while immersed in a cleaning fluid, certain parts of the cleaning fluid tank and vibrator assembly supporting bracket being fragmentarily illustrated;

FIG. 3 is another longitudinal section of the vibrator assembly positioned in operative relation to a tubular filter unit to be processed, and as the same would appear when viewed along line 3—3 of FIG. 2, this view also showing certain parts of an amplitude pick-up device which is supported by the housing of the vibrator assembly;

FIG. 4 is a transverse section of the vibrator assembly as the same would appear when viewed in the direction of the arrows along line 4—4 of FIG. 2;

FIG. 5 is another transverse section of the vibrator assembly as the same would appear when viewed in the direction of the arrows along line 5—5 of FIG. 2;

FIG. 6 is a further transverse section of the vibrator assembly as the same would appear when viewed along line 6—6 of FIG. 2;

FIG. 7 is an end view of the working face of the vibrator unit and the end faces of the spacer legs of the vibrator assembly as the same would appear when viewed along line 7—7 of FIG. 3, the end faces of the spacer legs being designed to seat against the outer surface of the filter unit to thereby maintain the working face of the vibrator unit in proper spaced relation to the adjacent surface of the filtering screen when undergoing cleaning treatment;

FIG. 8 is a plan view of the filter unit supporting assembly which shows a tubular filter unit mounted thereon and in operating relation to the working end of a vibrator assembly, and as the same would appear when the filter unit is immersed in the cleaning fluid, this view also showing in phantom lines a part of the tubular filter unit and its supporting adapter in telescopic relation to the filter unit supporting tube of the assembly;

FIG. 9 is a longitudinal section of the filter unit supporting assembly, including its filter unit supporting tube, connecting knuckle and adapter as the same would appear when viewed along line 9—9 of FIG. 8.

FIG. 10 is an end view of the filter unit supporting assembly as the same would appear when viewed along line 10—10 of FIG. 8, certain parts thereof being shown in section;

FIG. 11 is a fragmentary section showing further details of the connecting knuckle which connects the filter unit supporting tube to the slidable supporting arm of the supporting assembly, as the same would appear when viewed along line 11—11 of FIG. 8, this view showing further details of the cleaning fluid passages in the manifold cylinder of the connecting knuckle which lead to corresponding passages in the filter unit supporting tube;

FIGS. 12 and 13 are cross-sections taken through the connecting knuckle as the same would appear when viewed along line 12—12 of FIG. 11, and which indicate the two positions into which the manifold cylinder of the connecting knuckle can be adjusted to support the filter unit supporting tube in horizontal position and in vertical position;

FIG. 14 is an elevational view showing a fragmentary part of the filter unit supporting assembly corresponding to that shown in FIGS. 8 and 9, but having a modified form of adapter slidably mounted on its supporting tube and which is designed to rotatably support the relatively flat filtering screen of another type of filter unit in operative relation to the working face of the vibrator assembly;

FIG. 15 is a top plan view of the modified adapter as the same would appear when viewed along line 15—15 of FIG. 14, and which also shows the modified filter unit mounted in operative position on this adapter;

FIG. 16 is a transverse section of the modified adapter and modified filter unit mounted thereon, and a fragmentary part of the supporting tube, as the same would appear when viewed along line 16—16 of FIG. 15;

FIG. 17 is a diagrammatic view of the biased alternating current generating and tuning and amplitude control system, which supplies high frequency biased alternating current to the vibrator assembly under controlled frequency and amplitude conditions;

FIG. 18 is a flow diagram of the cleaning fluid circulation system of the apparatus;

FIGS. 19 and 20 are transverse sections of the cleaning fluid reversing valve forming a part of the fluid circulation system, and showing the two positions to which the reversing valve may be adjusted to alternatively control the cleaning fluid flow to and from the immersed filter unit as supported on the cleaning fluid tube of the filter unit supporting assembly;

FIG. 21 is an elevational view of one type of tubular filter unit which may be cleaned and processed by the method and apparatus of this invention;

FIG. 22 is a transverse section of the tubular filter unit as viewed along line 22—22 of FIG. 21 and as the same may appear when the filter element is clogged with particle debris to be removed by the method and apparatus of this invention;

FIG. 23 is an elevational view of a modified form of tubular filter unit adapted to be cleaned by the method and apparatus of this invention;

FIG. 24 is a transverse section of the modified filter unit as the same would appear when viewed along line 24—24 of FIG. 23, this view showing the filtering element loaded with particle debris which can be removed by employing the method and apparatus of this invention;

FIG. 25 is a greatly magnified plan view of a small portion of one type of filtering screen which may provide the filtering element of the filter unit, and whose micron size pores are defined between micron sized warp and woof threads of high tensile strength, which are welded or bonded to each other in rigid position, and whose micron size pores effectively operate to filter out microscopic debris particles from the fluid stream;

FIG. 26 is a greatly magnified fragmentary section of another type of filter screen or fabric from which the filtering element of the filter unit may be formed, and which is composed of a series of warp threads interwoven with woof threads to provide filtering pores of extremely minute size;

FIG. 27 is another greatly magnified fragmentary section of the modified filtering screen woven as indicated in FIG. 26 and as the same would appear when viewed along line 27—27 of FIG. 26;

FIG. 28 is another greatly magnified fragmentary section of the woven filter screen shown in FIG. 26 and as the same would appear when viewed along line 28—28 of FIG. 26;

FIG. 29 is an elevational view of one form of filter unit containing cell forming a part of an hydraulic system whose hydraulic stream is to be filtered; and FIG. 30 is a longitudinal section of the filter unit containing cell as the same would appear when viewed along line 30—30 of FIG. 29, this view showing a longitudinal section of one of the filter units pocketed within the cell chamber and as it would appear when in filtering position.

Similar reference characters refer to similar parts throughout the several views of the drawings and the specification.

The various integrated operating components of the apparatus of this invention are contained within, supported by or mounted on, a cabinet 100 mounted on suitable rollers 100' as shown in FIG. 1, and which permits movement and transportation of the complete apparatus. The cabinet 100 presents end walls 101, a removable back wall 102, a front wall 103 and a bottom wall 104. The cabinet 100 also presents a table top panel 105 having a depressed cleaning fluid sink or tank 66 in which a bath 65 of cleaning fluid is contained. The cabinet 100 also includes as a part thereof, an instrument case 106 which rises above the table top panel 105 at the rear thereof as shown in FIG. 1. The instrument case 106 contains cleaning fluid tubing and associated instruments and control devices whose control knobs and indicators appear on the front of the instrument panel 107 and within convenient view and reach of the operator. The front wall 103 presents one or more hinged doors 103' through which various apparatus components contained within and supported by the bottom wall 104 of the cabinet may be conveniently reached for adjustment or repair. The front wall 103 of the cabinet may also present a sliding drawer 103" in which various small tools and spare component parts of the apparatus may be contained for the convenient use of the operator. The end walls 101 of the cabinet may be equipped with pusher handles 101' by means of which the cabinet may be manually rolled along the floor.

In general, the apparatus of this invention comprises a vibrator assembly A whose tubular housing 10 contains and supports a vibrator unit 1 whose working face 7 projects beyond one end of the tubular housing 10 as shown in FIG. 1. The vibrator assembly A is mounted in inclined position as shown in FIG. 1 by means of a suitable bracket 108 which may be fixed to the table top panel 105 of the cabinet. The vibrator assembly A is so supported and mounted that the working end of its vibrator unit is immersed in the cleaning fluid bath 65 contained in the cleaning fluid tank 66. The instrument case 106 may be shaped to present an opening or depressed pocket 108' into which the upper end of the inclined vibrator assembly A may extend, with the working end 7 of its vibrator assembly 1 extending into the tank 66 at approximately the longitudinal mid-section thereof.

The apparatus of this invention also includes an amplitude indicator system B as shown in FIGS. 3 and 17 which includes an amplitude pick-up device 25 supported on the tubular housing 10 of the vibrator assembly A, and which is sensitive to any variations in amplitude exhibited by the vibrator unit 1 of the vibrator assembly A when vibrated. Differential voltage wires extending from the amplitude pick-up device 25 are connected in circuit with a voltage amplifier 30a and voltage meter 30b which visibly indicates on an amplitude indicator 30c the performance characteristics of the vibrator unit in terms of its amplitude of vibration.

The apparatus also includes a power generating system C as shown in FIGS. 1 and 17, which includes a voltage regulator unit 41, a power supply generator 42, and a power generator unit 43 which are contained within the cabinet 100 and supported on the bottom wall 104 thereof as shown in FIG. 1, and thus conveniently accessible for replacement and repair through an opening closeable by the front door 103' of the cabinet. The power generating circuit is powered by normal line current supplied by a power line 40 extending from the rear wall 102 of the cabinet as shown in FIG. 1. The power generating system C operates to transform normal line current, such as sixty cycle 115 volt current, into a biased alternating current of ultrasonic frequency which may be adjusted, tuned and controlled by frequency control means whose manipulative element is mounted on the instrument panel 107 and within convenient reach of the operator.

The filter unit may be adjustably supported by a filter unit supporting assembly D, as shown in FIG. 1 and further illustrated in FIGS. 8–16, and which includes an outer tube 50 to which a removable adapter 60 or 60a is applied on which the filter unit to be cleaned is mounted. The filter unit may be rotated, longitudinally reciprocated or otherwise manipulated as the cleaning operation proceeds to progressively place progressive areas of its filtering screen f in adjacent relation to the working face 7 of the vibrator assembly A. The filter unit supporting tube 50 of the supporting assembly D is connected to the manifold cylinder 53 of a supporting knuckle 52 mounted on an adjustable arm 56 which may be adjustably affixed to a supporting bracket 57 attached to a ledge of the cleaning fluid tank 66. The knuckle 52 is so constructed that its manifold cylinder 53 may be rotated through a ninety degree angle, so that the filter unit supporting tube 50 extending therefrom, may be swung from horizontal and fluid immersed position, to a vertical position and vice versa, at the convenience of the operator, as indicated in FIG. 9.

A cleaning fluid pressure and suction system E is contained within the cabinet 100 and instrument case 106, and connected by tubing to the manifold cylinder 53 of the filter unit supporting assembly D. The cleaning fluid system may incorporate a centrifugal pump 73 driven by motor 74, a cleaning fluid filtering device 80, and two-way reversing valve 68 which can be manually adjusted to supply cleaning fluid under pressure through tube 50 and to one side or surface of the filtering element $f$ of the filtering unit F or F' while the filtering element is subjected to the hyper-intense cavitational action of the cleaning fluid in which the filter unit is immersed, as engendered by the vibrating working face 7 of the vibrator assembly A which is positioned adjacent the opposite surface of the filtering element.

By an alternative adjustment of the two-way reversing valve 68, fluid suction may be applied to one surface of the filtering element of the immersed filter unit, while the filtering element is subjected to the hyper-intense cavitational action of a limited column of cleaning fluid as engendered by the vibrator action of the working face 7 of the vibrator assembly A positioned adjacent the opposite surface of the filtering element. The cleaning fluid flow position of the reversing valve 68 is controlled by a foot pedal 68a conveniently positioned adjacent the building floor where the operator stands when performing the cleaning operation.

All of the several instruments and devices for adjusting, regulating, tuning and controlling the operation of the vibrator assembly A and the cleaning fluid flow system E, may be so positioned and arranged that their control knobs or elements are within convenient and easy reach of the operator, with lighting circuits and gauges conveniently placed to visually indicate the operating performance of various components of the apparatus.

The structural details and performance characteristics of the method and apparatus of this invention may be better understood by first examining typical filter units which can be effectively and thoroughly cleaned by the application of the principles of this invention.

*The Filter Units To Be Cleaned*

The method and apparatus of this invention is particularly designed and adapted for cleaning and removing particle debris from various types and kinds of filter units, and which particle debris has collected in or around the filter unit during the filtering of gaseous or fluid streams of various types and kinds, such as liquids and gases used in pressure systems, and liquids and gases used in the processing and production of pharmaceuticals, chemicals and other products which require the removal of particles or debris from the gaseous or liquid stream. Filters used for such purposes must often operate in extremely high pressure systems, are often subjected to corrosive gases and liquids, must operate to reliably remove extremely small microscopic or micron size particles from the gaseous or liquid stream with exacting reliability, and must be so designed as to cause a minimum pressure drop in the gaseous or liquid stream passing through the filter unit.

FIGS. 21–24 and FIGS. 14–16 illustrate typical forms of filter units F and F' which the method and apparatus of this invention are designed to thoroughly clean. The critical filtering screen or element $f$ of these filter units comprises a screen or tightly woven fabric of micron size threads made from metal or plastic of high tensile strength, which will not be corroded by the gaseous or liquid stream which is to be filtered, and whose threads are rigidly bonded to one another so that the filtering pores of the filtering screen or fabric are faithfully maintained at a predetermined microscopic size. Where a filtering element $f$ is woven in the form of a screen to provide pores which are less than eighteen microns in size, it may be woven from warp threads $f'$ and woof threads $f''$ which are welded or bonded together at their crossing points to present substantially square shaped pores therebetween as shown in FIG. 25. Where the filtering element $f$ is to present filtering pores which are smaller in size, it is preferably made in the form of a fabric composed of warp threads $f'$ extending in closely spaced parallel relation and interwoven with woof threads $f''$ and $f'''$ as shown in FIGS. 26, 27 and 28, each of which extends between and around alternate pairs of warp threads $f'$, and all tightly woven together so that the minute filtering pores defined between the warp and woof threads are of predetermined and uniform micron size, and which pores are often so small as to be invisible to the naked eye and which can only be observed under substantial magnification. The warp threads $f'$ and woof threads $f''$ and $f'''$ may be composed of stainless steel or other metal alloys of very high tensile strength and resistant to corrosion, or the threads or filaments can be made of non-corrosive artificial fibers having the desired characteristics, such as high quality nylon, fibreglass or like plastic compound filaments.

The warp and woof threads $f'$, $f''$ and $f'''$ are welded or bonded together at their contact points by special process so that the warp and woof threads faithfully maintain their interwoven relation, with consequent maintenance of the filtering pores formed thereby of predetermined and uniform micron size. These filtering screens or fabrics are designed to provide pore size of faithful uniformity throughout the filtering area of the filtering screen, and may be designed to provide uniform sized pores as small as two microns or less, and up to ten microns or larger in cross-section. A characteristic of these filtering screens and fabrics is that all of the filtering pores thereof are substantially uniform in micron size, so that any particle debris contained in the gaseous or liquid stream being filtered which is larger than the uniform size filter screen pores, will be caught by the filter screen or fabric $f$ and screened out of the gaseous or liquid stream passing through the filter unit.

The filter screen or fabric $f$, after manufacture as above described, is then corrugated as shown in FIGS. 14, 15, 16, 22 and 24. The corrugated screen or fabric may be rolled into a tube as shown in FIGS. 22 and 24, with the meeting ends of the corrugated filter screen or fabric carefully welded or bonded together to provide an integral and corrugated filter screen tube, all of whose pores have substantially the precise uniform area and filtering characteristics for which the filtering screen is specifically designed.

The tubular and corrugated filter screen $f$ of the tubular filter unit F may be strengthened and reinforced by the insertion of a wire coil $g$ therein as shown in FIGS. 22 and 30 which serves to maintain the corrugated filter screen in tubular form, without impeding gaseous and liquid flow therethrough, or otherwise detracting from its filtering capabilities. Alternatively, the corrugated and tubular filter screen $f$ may be braced and supported by an inner tubular supporting screen $h$, as shown in FIGS. 23 and 24, whose openings may be in the order of one-sixteenth to one-eighth of an inch in area. An outer tubular supporting screen $h'$, having openings in the order of one-sixteenth to one-eighth of an inch, may also be applied to extend around the exterior of the tubular and corrugated filtering screen or fabric $f$ to provide further support and protection therefor.

One end of the tubular and corrugated filtering screen or fabric $f$ is normally closed by an end closure plate $i$ as shown in FIGS. 21 and 22 which is welded or rigidly bonded to the adjacent terminal end of the tubular and corrugated filter screen or fabric $f$, in a manner to provide a leak-proof seal which prevents the flow of gases or liquids through the sealed joint. The end closure plate $i$ may be provided with a centering stud $i'$ as shown in FIG. 21. The upper end of the filter unit F is capped by an end ring $j$ as shown in FIGS. 21 and 23, which is also welded to the adjacent upper end of the adjacent tubular and corrugated filter fabric $f$ to provide a leak-proof joint therebetween. The end ring $j$ may be provided with an outwardly projecting collar portion $j'$ as shown in FIG. 21 which forms an integral part of the end sealing ring $j$. The end ring $j$ with or without a collar portion $j'$, provides an outlet for the gases or liquids which have been filtered by passage through the body wall of the filter unit.

The tubular filter units F shown in FIGS. 21 and 23 are relatively light in weight and may be made of any size, ranging from approximately only an inch in length, with an external diameter of approximately one-half inch, up to ten or more inches in length with the diameter as high as five inches or more. Since the effective filtering element $f$ normally comprises only a single layer of corrugated filter screen or fabric, resistance to gaseous or liquid flow therethrough is relatively small, and may cause a pressure drop in the order of only two p.s.i. or less when the filter is not unduly clogged with particle debris. The debris $p$ which collects during use of the filtering unit must be occasionally removed to maintain the filter in efficient working order.

FIGS. 29 and 30 illustrate one form of filter unit containing cell or casing G in which the filter unit F may be pocketed when in filtering use. The filter casing G shown in FIGS. 29 and 30 is one of the many types which may be used as a component of a gas or liquid flow system and which may be under extremely high pressures. For example, hydraulic systems used on jet aircraft for the manipulation of landing gear, ailerons and the like, are often designed to operate at extremely high pressures and so designed to reduce the weight. These high pressures can only be achieved by making the compressors, pumps, valves and other components of the high pressure system to extremely exact tolerances. To overcome the danger of sticking or malfunctioning of the moving parts or components of such high pressure systems, it is essential that all fine metal particles and other particle debris, resulting from parts wear or breakdown of the hydraulic gases or fluids used, be thoroughly removed at various points in the high pressure system so that only clean hydraulic gas or fluid be permitted to enter a moving part of the system.

FIG. 30 is a cross-section of a typical filter casing G used to support a tubular filter unit F such as above described in filtering position in a high pressure flow system. The filter casing G comprises a tubular cell $m$, one end $m'$ of which is closed, and whose interior surface provides support for the end plate $i$ of the filter unit F. The cell $m$ presents an interior chamber $m''$ whose diameter is slightly larger than the exterior diameter of the tubular filter unit F pocketed therein, and whose upper end is connected to a coupling $n$ having an inlet port $n'$ and an outlet port $n''$ connected into the flow line of the high pressure system. The coupling $n$ contains a spring pressed sealing collar $o$ designed to snugly seat against the end ring $j$ of the filter unit F, and around which contaminated hydraulic fluid or gas may flow into the inner chamber $m''$ of the filter unit supporting cell $m$, thence through the tubular filtering element $f$ of the filter unit F which screens out particle debris therefrom. The cleaned gaseous or liquid stream enters the interior of the tubular filter unit F and escapes through the sealing collar $o$ and out through the discharge port $n''$ of the coupling $n$.

Past experience has indicated that a tubular filter unit F constructed as above described will in most cases require cleaning after approximately two hundred hours of filter use. The filter supporting cell $m$ can then be detached from the coupling $n$ and the filter unit F removed therefrom for cleaning. The filter unit F to be cleaned will present varying amounts of particle debris $p$ deposited on its corrugated filter screen or fabric $f$ as shown in FIGS. 22 and 24, which can be effectively and quickly removed by the method and apparatus of this invention.

The method and apparatus of this invention may also be effectively used for the cleaning of numerous shapes and types of filter units composed of either corrugated or uncorrugated filter screen or fabric, or for the cleaning of various other types of filters whose main filtering element is composed of a pack of filtering screens, or filtering element composed of porous metal powder, plastics, ceramics, and other materials presenting filter pores of desired size characteristics.

As an illustrative example, relatively flat filter units F', as illustrated by way of example in FIGS. 14, 15 and 16, may be thoroughly cleaned by the method and apparatus of this invention. The filter unit F' shown in these figures may be composed of a filtering screen or fabric $f$ woven from very fine wires, filaments or threads composed of woof threads $f'$ and one or two warp threads $f''$ and $f'''$ as above described and illustrated in FIGS. 25–28, which is then corrugated with either lineally extending or concentric corrugations, and with the outer rim of the screen carefully welded or bonded to an outer rim $r$. Where the corrugations are formed in concentric circles, a small diameter core plate $r'$ may be provided at the center of the filter unit F'. A specially designed adapter as illustrated in FIGS. 14, 15 and 16 may be used to support its filtering screen $f$ in minute spaced relation to the working face 7 of the vibrator assembly A, as hereafter more fully described. One or more such filtering units F' arranged in stacked relation, contained within a suitable filtering cell, may be used in the filtering system. Filtering units which are conical, hemispherical or numerous other shapes may be effectively cleaned by the method and apparatus of this invention by the provision of a suitable screen supporting adapter.

The Vibrator Assembly

The vibrator assembly A as shown in FIG. 1 is supported to present the working face 7 of its vibrator unit 1 in minutely spaced relation to the filter screen $f$ of the filter unit F or F' to be processed, while the filter unit is immersed in the cleaning fluid. The filter unit F or F' is adjustably supported by the filter unit supporting assembly D in a manner so that the filter unit may be manually or mechanically rotated and longitudinally moved or reciprocated so as to position progressive cleaning site areas of its filtering screen $f$ in adjacent relation to the working face 7 of the vibrator unit 1 of the vibrator assembly. The working face 7 of the vibrator unit 1 may be vibrated at frequencies in the order of five to fifty thousand cycles per second and at relatively small amplitudes, and which vibrations produce hyper-intense cavitation of a limited column of the cleaning fluid extending through the filtering screen $f$ and which covers a cleaning site area corresponding to the area of the working face 7 of the vibrator unit 1 and the immediately adjacent area of the filter screen $f$.

The vibrator assembly A, as shown more particularly in FIGS. 2 to 7 inclusive, essentially comprises a vibrator unit 1 which includes a transducer section 2 connected to the input end of an amplitude magnifying connecting body or acoustical impedance transformer 5 whose output end 7 provides the working face of the vibrator assembly. The transducer section 2 of the vibrator unit 1 may be any one of a number of electrical mechanical types, such as electrodynamic, piezoelectric, or magnetostrictive. However, at an operating frequency in the order of five to fifty thousand cycles per second, the transducer section 2 preferably is of the magnetostrictive type and may be composed of a stack of metal plates $2'$ as shown in FIGS. 4 and 5. Each metal plate $2'$ is of uniform thickness and preferably concavo-convex in cross-section and is formed from a metal such as permanickle, permendur, or other metal having high tensile strength and is highly magnetostrictive in character, so that the transducer section 2 will longitudinally vibrate to a maximum degree when subjected to the influence of an alternating magnetic field.

The stacked metal plates 2' which compose the transducer section 2 may be maintained in compact internested relation as shown in FIGS. 3 and 4 by means of a resilient clamp 3 which includes a body pin 3' set within a conforming bore drilled through the plate stack, and which has a threaded end portion 3'' to which a clamp nut 3''' may be adjustably applied. The inner end of the body pin 3' is connected to one end of a coil tension spring 4 whose other end is connected to a plug pin 4' having a threaded end portion 4'' to which a clamp nut 4''' is applied. By a proper manipulation of the clamp nuts 3''' and 4''', the stacked plates 2' may be clamped together to provide a compact stack, but which nevertheless permits such differential longitudinal expansion of the compactly stacked plates as may result from the increase in temperature to which the stacked plates are subjected when energized by an alternating magnetic field.

The output end of the transducer section 2 is rigidly connected to the input end of the connecting body 5. The connecting body 5 presents an enlarged body section 5' which may be generally rectangular in cross-section but of larger cross-section than the transducer section 2. The enlarged body section 5' of the connecting body 5 is rigidly secured to the output end of the transducer section 2 as by silver solder, and presents its narrower side faces substantially in alignment with the narrower side faces of the transducer section 2, with its broader side faces merging into the broader faces of the transducer section 2 by tapered neck faces 6'. The connecting body 5 also includes a reduced body section 5'' of smaller cross-sectional area than the enlarged body section 5', but may be generally rectangular in cross-sectional area, with the edge faces thereof substantially in alignment with the edge faces of the enlarged body section 5', and with the side faces thereof integrally joined to the side faces of the enlarged body section 5' by tapered neck faces 6'. The substantially flat and rectangular end face 7 of the reduced body section 5'' of the connecting body provides the working face of the vibrator unit. The connecting body 5 should be made of a strong metal such as tool steel, Monelmetal, titanium, Phosphor-bronze, brass, beryllium, copper or the like having high tensile strength.

The transducer section 2 of the vibrator unit 1 should have a length corresponding to one-half wavelength or integral multiples thereof at the vibration frequency of the transducer section; and the connecting body 5 should have a length corresponding to one-half wavelength or integral multiples thereof at the vibration frequency of the transducer section. The vibrator unit 1 should be designed to produce longitudinal motion strokes at the working face 7 thereof whose amplitude may be in the order of one to three thousandths of an inch. The length of the longitudinal motion strokes may be designed into the vibrator unit 1 in accordance with the metals from which it is formed, the acoustical characteristics of the metal, the frequency of vibration, and the length, shape and form of its components.

The transducer section 2 and a major part of the connecting body 5 of the vibrator unit is contained in a tubular housing 10 which includes a tubular casing 11 formed of a non-magnetic and non-electrical conducting material such as nylon or like moldable plastic compound, as shown in FIGS. 2 and 3. The tubular casing 11 contains and supports a winding spool 12 formed of non-magnetic and non-electrical conducting material and which presents a tubular body 12' in surrounding relation to the transducer section 2 of the vibrator unit, and which is supported by circular side plates 12'' fixed to the tubular body 12' and whose circular peripheries are in bearing contact with the inside surface of the tubular casing 11.

An enamel coated current conducting wire 13 is wound in a multiplicity of layers on the tubular body 12' of the winding spool 12 as shown in FIGS. 2 and 5. The tubular body 12' of the winding spool 12 is preferably generally rectangular in cross-section, and only slightly larger than the rectangular cross-section of the intermediate portion of the transducer section 2 which extends therethrough, and so that the energizing winding 13 is positioned in relatively close proximity to the intermediate portion of the transducer section 2. Biased alternating current of selected frequency is supplied to the winding 13 to thereby establish an alternating magnetic field in surrounding relation to the intermediate portion of the transducer section 2, to thereby cause the transducer section to longitudinally vibrate in accordance with the frequency of the biased alternating current and the acoustical characteristics of the metal from which the transducer section 2 is made.

The terminal lead wires 13' which extend from the winding 13 are provided with terminal socket connectors which may be moulded into a supporting plug 14. The supporting plug 14 snugly seats within an externally threaded collar portion 11' which may be integrally formed as a part of the tubular casing 11. Insert prongs supported by a companion supporting plug 14' are designed to be plugged into the socket connectors. The prong supporting plug 14' may be snugly pocketed within an internally threaded coupling 15 which may be applied to the externally threaded collar portion 11' of the tubular casing 11. A flexible conduit 15' contains the current supply wires 13'' which are secured to the terminal prongs. The flexible conduit 15' and the current supply wires 13'' contained therein lead to a source of biased alternating current of selected frequency as hereafter described.

A vibrator unit supporting collar 16, attached to the head end of the tubular casing 11, provides substantially the sole support for the vibrator unit 1, as shown in FIGS. 2, 3 and 6. The vibrator unit supporting collar 16 may be formed from a relatively light metal such as aluminum, and has an internal body wall 16' presenting a conforming hole 16'' therein through which the enlarged body section 5' of the connecting body 5 extends. The supporting collar 16 may be provided with an inset flange portion 16''' over which the head end of the tubular casing 11 may be snugly telescoped and secured as by suitable screws. A pair of spacer legs 17 project forwardly from diametrically opposite sides of the supporting collar 16 as shown in FIG. 3. Each spacer leg 17 terminates in foot portion 17' which presents an end face 17'' designed to seat against the surface of the filter screen $f$ to be cleaned. The spacer legs 17 serve to maintain the working face 7 of the vibrator unit 1 in proper minutely spaced relation to the surface of the filter screen $f$ under treatment to insure the most effective cavitation of the cleaning fluid layer interposed between the working face 7 and the vibrator unit 1 and the filtering screen $f$ at the cleaning site area thereof.

The vibrator unit 1 is held in operative position by three studs 18, two of which are positioned along one of the broad sides of the vibrator unit connecting body 5. The third stud 18 is positioned adjacent the opposite broad side of the vibrator unit connecting body. Each of the three studs 18 presents a body portion 18', an enlarged head portion 18'', and a centering crown 18''' designed to seat snugly within a conforming pocket 5a formed in the adjacent broad side face of the enlarged body section 5' of the vibrator unit 1. As shown in FIG. 6, the body portions 18' of the two studs adjacent one broad side of the connecting body 5 are each fitted within a bored hole 16a formed in the body wall 16' of the supporting collar 16, with the head portions 18'' thereof seating against the inner side face of the body wall 16' of the supporting collar 16, with the head portions 18'' thereof seating against the inner side face of the body wall 16' of the supporting collar 16. The centering crowns 18''' of the two adjacent supporting studs 18 provides bearing support for the adjacent broad side of the enlarged body section 5' of the connecting body 5 of the vibrator unit.

The third supporting stud 18 on the opposite broad side of the connecting body 5 of the vibrator unit has a body portion 18' which extends into a socket hole 19' formed in the end of an externally threaded plug 19 which is threaded into a threaded bore extending radially through the body wall 16' of the supporting collar 16. The threaded plug 19 has an exposed head portion 19'' which may be externally manipulated. The enlarged head portion 18'' of third stud 18 whose body portion 18' extends into the socket hole in the externally threaded plug 19, is designed to be engaged by the terminal end of the threaded plug 19 and manipulated so that the crown portion 18''' thereof may be driven into the conforming hole 5a of the connecting body 5 by rotative manipulation of the threaded plug 19, without rotating the stud 18 associated therewith. The centering crowns 18''' of the three supporting studs 18 are positioned to engage the connecting body 5 of the vibrator unit 1 in the approximate area of a node of vibration thereof. By manipulating the exposed head portion 19'' of the threaded plug 19, the centering crown 18''' of its stud 18 may be withdrawn from the adjacent centering pocket 5a formed in the connecting body 5, and the entire vibrator unit 1 then withdrawn from the housing 10. In like manner, the threaded plug 19 may be manipulated so that the centering crown 18''' of its stud 18 seats in the adjacent conforming pocket 5a formed on the adjacent side of the connecting body 5 to firmly secure the vibrator unit in mounted position between the centering crowns 18''' of the three studs 18, with the reduced body section 5'' of the vibrator unit 1 extending beyond the body wall 16' and between the spacer legs 17 of the supporting collar 16.

Since the transducer section 2 generates heat during vibration, it is desirable to provide a coolant in surrounding relation to the transducer section 2 to maintain the transducer section 2, connecting body 5 and surrounding tubular housing 10 in relatively cool condition. This may be accomplished by driving a stream of cooling air through the tubular casing 11 as by means of a turbine type fan 21 contained in a fan casing 22 having an air stream directing throat section 23 connected to the tail end of the tubular casing 11. This connection may be made by the provision of an end collar 20, as shown in FIGS. 2 and 3, having an inset shoulder portion 20' which telescopes into the tail end of the tubular casing 11 and is suitably secured thereto as by securing screws. The end closure collar 20 has a rectangular shaped air inlet hole 20'' therein which conforms to the rectangular area of the air inlet throat section 23 of the fan casing 22. The air inlet throat section 23 of the fan casing 22 may be provided with flared flanges 23' secured to the exterior end face of the end collar 20 as by suitable screws as shown in FIG. 3.

The fan casing 22 and its rectangular air inlet throat section 23 may be formed of two half sections each presenting a semi-circular body portion 22a joined to a side wall rim 22b which merges into the air inlet throat section 23, as shown in FIGS. 2 and 3. The half sections may be provided with outwardly flared flange portions 22c which may be detachably secured together as by spaced screws to thereby provide convenient access to the fan 21 contained in the half sections of the fan casing 22. The turbine type fan 21 presents a series of curvilinear blades 21'. One end of the curvilinear blades 21' are secured to a connecting ring 21'' and the other end of the blades are secured to a circular connecting plate 21'''. The fan 21 is driven by a fractional horsepower constant speed motor 24 whose casing is secured to the adjacent side wall rim 22b of the fan casing 22. The motor shaft 24' is secured to a hub portion 24'' which forms a part of the side wall plate 21'''' of the fan 21.

Since an air flow in the order of ten cubic feet per minute is sufficient to supply adequate cooling of the transducer section 2 and and connecting body 5 of the vibrator unit 1 as well as the housing 10, a relatively small turbine type fan 21 driven by a small fractional horsepower motor 24 is sufficient to generate the required air stream. The generated air stream freely flows around the transducer section 2 and a portion of the connecting body 5, and also through spaced air holes 12''' formed in the circular side plates 12' of the winding supporting spool 12. The warmed air escapes through a series of spaced holes 11'' formed in the circular wall of the tubular casing 11 adjacent the inset flange portion 16''' of the vibrator unit supporting collar 16.

The relatively thin magnetostrictive metal plates or laminates 2' which compose the transduced stack 2 are made substantially identical in width and length as shown in FIGS. 3, 4 and 5, and each has the same arcuate or concavo-convex curvature which is not substantially more than sixty degrees, and preferably in the order of twenty degrees to forty-five degrees. The metal plates or laminates 2' are also of substantially the same thickness, and as customary, are coated with an oxide of the metal of which they are composed to reduce eddy current losses. By limiting the concavo-convex curvature of the laminates as illustrated in FIGS. 4 and 5, the laminates can be compactly stacked with substantially no spacing or gap therebetween. The laminates 2' may also be made relatively thin so that the magnetic flux, supplied by the surrounding alternating magnetic field generated by the energized winding 13, penetrates the thickness of the laminates to a major degree, and yet, due to their concavo-convex curvature, the laminates can be made sufficiently stiff and rigid when compactly nested together, so that no appreciable bending movement or bending waves occur along the length of the laminates when longitudinally vibrated at the operating frequency.

It will also be noted, by referring to FIGS. 2 and 3, that the laminates at the free end of the transducer stack are not joined by the customary solder cap or soldered key connection, so that the laminates can independently vibrate without impediment, and which feature further reduces flexural strains on the laminates. Each of the stack laminates, however, is rigidly bonded as by silver solder to the adjacent end of the connecting body 5. As shown in FIGS. 2 and 3, the adjacent end of the connecting body 5 should have a soldering area which is not less than the cross-sectional area of the compactly stacked laminates so that a rigid bond therebetween is assured.

It will also be noted by referring to FIGS. 2 and 3, that the winding 13 presents a plurality of layers of compactly wound and insulated winding wire to provide a winding coil which is relatively short in length and is centered at a nodal area of the transducer stack 2, so that the alternating magnetic field produced thereby is concentrated at the nodal area, with resultant minimum power loss and maximum use of input power in the production of useful mechanical vibrations. By the use of cooling air to cool the transducer section 2, the heat generated by the transducer section during vibration is constantly removed and is kept relatively cool, thereby preserving its magnetostrictive qualities and insuring a long useful life thereof. The vibrator unit comprising the transducer section 2 and connecting body 5 can also be readily removed and replaced. It will also be appreciated that the vibrator assembly above disclosed can be used for other purposes than the cavitation of liquids and the cavitational cleaning of porous objects, by securing a suitable work tool to the working end of the connecting body 5 which is adapted to perform various boring, cutting, chipping and drilling operations, with or without the use of abrasive slurries, as is well known in the art.

The entire vibrator assembly A, including its housing 10, vibrator unit 1 and fan casing 22, with the fan 21 contained therein and its driving motor 24 mounted thereon, may be assembled as a completely integrated unit. The vibrator assembly A is then adjustably mounted in inclined position as by means of a mounting bracket 108 adjustably attached to the supporting collar 16 of the vibrator assembly housing 10, and rigidly or adjustably attached to a convenient ledge of the cleaning fluid tank 66. The bracket 108 thus provides a rigid but adjustable support for the vibrator assembly so that its working face 7 may be precisely positioned at the desired location within the cleaning fluid bath 65 contained in the tank 66.

*Cyclic Frequency Indicator and Power Supply Circuit*

To produce the optimum hyper-intense cavitational effect on the cleaning fluid interposed between the working face 7 of the vibrator unit 1 and the adjacent filtering screen f, the working face 7 of the vibrator unit should vibrate at resonance frequency, and the power generating circuit C should accordingly be designed to supply biased alternating current within a limited optimum frequency range to insure vibration of the vibrator unit at resonance frequency. In order to supply biased alternating current to the winding 13 of the vibrator assembly A at optimum cyclic frequency, the biased alternating current generating system C is provided with tuning means under the control of the operator. To detect any malfunctioning of the power generating system C or the vibrator assembly A so that desired adjustments can be made to restore the system to optimum frequency and amplitude, some monitoring means for measuring the vibration amplitude or cyclic frequency at which the vibrator unit 1 is vibrating, is a desirable requisite. Since the amplitude of vibration varies with the frequency of vibration, the frequency of vibration can be determined by monitoring any variations in the amplitude of vibration of the connecting body 5 of the vibrator unit in the area of a node of motion thereof.

In the apparatus of this invention, the amplitude of vibration of the connecting body 5 of the vibrator unit 1 is registered by an amplitude indicator system B which includes the amplitude pick-up device 25 which may be made in several forms. For purposes of illustration, one form of amplitude pick-up device which may be used is associated with the vibrator unit supporting collar 16 as shown in FIG. 3, and which may comprise an open-ended cylindrical cartridge made from electrical conductive material which contains a piezoelectric crystal, formed of such materials as quartz or barium titanate. The piezoelectric crystal is so positioned and oriented that it is effectively responsive to the acoustical waves emanating from the area of a node of longitudinal motion or an anti-node of lateral motion of the connecting body 5 of the vibrator unit 1 during vibration thereof. The acoustical waves emanating from the area of a node of longitudinal motion (anti-node of lateral motion) of the connecting body 5 emerge through a window hole 16b in the supporting collar 16, and the piezoelectric crystal should be so mounted and oriented that it is responsive to compressional waves generated by either the longitudinal oscillations of the connecting body 5, or the lateral waves or breathing oscillations of the connecting body 5 at the nodal area thereof. While the longitudinal acoustical waves generated at the anti-nodal plane of longitudinal motion, and the lateral acoustical waves generated at the nodal plane of longitudinal motion of the connecting body 5 are not equal, they are nevertheless proportional, and therefore either source wave may be used to measure the longitudinal amplitude of vibration at the working face 7 of the vibrator unit 1.

The piezoelectric crystal is periodically deformed by the alternating pressure of the acoustical waves generated by the lateral vibrations of the adjacent side face of the vibrating connecting body at the nodal area thereof, and while these periodic deformations are extremely minute, the quartz or barium titanate or like substance of which the crystal is composed, nevertheless generates from these periodic or cyclic deformations a correspondingly small voltage of about twenty microvolts on the opposite sides of the crystal which is proportional to the length of the cyclic deformations. A piezoelectric crystal is selected which has a flat response over the working frequency range, so as to insure an accurate indication of the displacement amplitude. The opposite side faces of the piezoelectric crystal are coated with an electrical conducting material, such as silver. One silver coated surface seats against the inturned end rim portion of the electrical conductive cylindrical cartridge and is thereby grounded and so held without movement.

The minute voltage developed at one silver coated face of the crystal is transmitted to a very fine wire in an insulated sheath contained in a flexible protective conduit 30. The opposite grounded face of the crystal is conductively connected to an outer grounding sheath also contained in the protective conduit 30. A feeble but nevertheless measurable and variable current will flow through the fine wire and grounding sheath enclosed within the flexible protective conduit 30.

The variable current conductors contained in the protective conduit 30 lead to a transistor amplifier 30a, as diagrammatically illustrated in FIG. 17, where this feeble current differential is greatly amplified and thus made more readily measurable. The amplifier 30a is in turn connected to a voltmeter 30b which is designed to measure the amplified voltage differential produced at the opposite silver coated surfaces of the piezoelectric crystal as a result of variations in acoustical compression waves generated by the lateral vibrations of the adjacent side of the vibrating connecting body 5 of the vibrator unit 1. Since it is desirable to visually indicate to the operator the variations in voltage thus produced in terms of variations in amplitude of the vibrating connecting body 5, an amplitude indicator instrument 30c is provided which translates the variations in electrical potential at the voltmeter 30b into amplitude indications on an amplitude scale and pointer forming a part of the amplitude indicator 30c as shown in FIGS. 1 and 17.

In this manner, variations in amplitude of vibration of the connecting body 5 of the vibrator unit 1 are visually evident to the operator on the amplitude indicator 30c. Since the power generating circuit C, which will presently be described, is designed to operate within a predetermined frequency range which determines the amplitude of vibration of the connecting body 5, optimum vibration amplitude of the connecting body can be maintained and visibly indicated on the amplitude indicator 30c, by a corresponding tuning adjustment of the biased alternating current generating circuit C.

The cylindrical cartridge and the piezoelectric crystal contained therein may be supported in operative relation to the window hole 16b of the vibrator unit supporting collar 16 by any suitable means which serve to cushion and protect the piezoelectric crystal from the influence of acoustical waves emanating from all vibratory parts of the vibrator assembly A, except its connecting body, and in a manner which insures minimum damping of the variations in voltage potential produced at the conductive surfaces of the piezoelectric crystal.

The power generating circuit C as shown in FIGS. 1 and 17 supplies biased alternating current of the desired regulatable frequency. If the vibrator unit 1 is designed to vibrate, for example at a resonance frequency of twenty thousand kilocycles per second, the power generating circuit would be adjusted to operate at this same optimum frequency, and to supply biased alternating current to the supply wires 13″ which lead to the transducer section energizing winding 13 at this frequency. Normal alternating line current which may be sixty cycle A.C. and approximately one hundred and ten volts is supplied to the generator system by current supply line 40 whose source plug 40′ is plugged into line current.

Since the line current may fluctuate in voltage, the current supply line 40 is connected to a voltage regulator unit 41 which stabilizes the voltage to a fixed value, so that uniform sixty cycle 115 volt current flows from the output line 41' of the voltage regulator unit 41 into a power supply generator unit 42. The power supply generator unit 42 converts the uniform voltage sixty cycle alternating input current to direct current which is conducted through the direct current output line 42' to a drive generator unit 43.

The drive generator 43 converts the input direct current, supplied through cable 42' by the power supply generator 42, to an alternating current having a preferred frequency of approximately twenty thousand cycles per second. A direct current bias is also imposed upon the alternating current produced by the drive generator 43. The drive generator 43 is also equipped with a variable tuning circuit 44 whereby the frequency of the biased alternating current output flowing into its output cable 44' may be tuned to the optimum frequency range at which the vibrator unit 1 will vibrate at resonance frequency. The output line 44' of the tuning circuit 44 leads to a tuning instrument 44a by means of which the tuning circuit 44 may be manually tuned. The tuning instrument 44a may present an indicating dial which registers the operating frequency of the power generator 43 and also presents a control knob 44b within convenient reach of the operator as shown in FIG. 1, and by means of which the operating frequency of the generator may be tuned or adjusted. The tuning instrument 44a is connected to the input cable 15' which contains the current wires 13'' leading to the winding 13, which forms a part of the vibrator assembly A.

Since the vibrator unit 1 is designed to operate at a predetermined optimum resonance amplitude and frequency, any variation from optimum amplitude will be registered on the amplitude indicator 30c. The control knob 44b of the tuning instrument 44a can be manually manipulated to adjust the tuning circuit 44 of the power generator 43 to optimum operating frequency, which results in the restoration of the operating vibrator unit 1 to optimum resonance amplitude and frequency.

The voltage regulator 41 is connected by control line 45 to a remote control power switch 45a mounted on the instrument panel 107 of the apparatus as shown in FIGS. 1 and 17, and whereby the power to the power supply generator 42, drive generator 43, and vibrator assembly A may be turned on or off. An electric light bulb 45b is connected to on-off switch 45a and mounted on the instrument panel 107 to indicate when the power is on or off.

Since the drive generator 43 contains filament tubes which must first be heated up to avoid damage thereto before the vibrator assembly A is placed in operation, a time delay instrument 46 is positioned on the line 42' which connects the power supply generator 42 to the drive generator 43. In an interval of about one minute, the filament tubes will be properly heated for operation, and when sufficiently heated, the time delay instrument 46 will pass current through lead line 46' to light an electric bulb 46a mounted on the instrument panel 107 as shown in FIG. 1. When the bulb 46a is thus lighted, the vibrator assembly A can be put into operation. This is effected by tripping an operate switch 47a joined to the power supply generator 42 by control line 47. When the operate switch 47a is "on," a light bulb 47b connected thereto is lighted. The operate switch 47a and light bulb 47b are both mounted on the instrument panel 107 of the apparatus as shown in FIG. 1, and operate switch 47a is placed in "on" position when the time delay light bulb 46a is lighted.

From the above description, it is apparent that the power generator circuit C is placed in operation by first tripping switch 45a so that current is supplied to the power supply generator 42 and drive generator 43. When the delay instrument 46 operates to light the light bulb 46a, the operate switch 47a may be closed, and biased alternating current will then flow from the power generator 43 through power cable 44' and to the winding 13 of the vibrator assembly A which drives the vibrator unit 1. Optimum vibrating frequency and amplitude at the working face 7 of the vibrator assembly is obtained by observing the operating amplitude registered by the amplitude indicator 30c, and then adjusting the tuning control knob 44b to thereby tune the power generator circuit C to a frequency which will produce the optimum amplitude reading on the amplitude indicator 30c.

*The Filter Unit Supporting Assembly*

In practicing the method and apparatus of this invention, the filter unit is immersed in a bath 65 of cleaning fluid and removably supported by a filter unit supporting assembly D as illustrated in FIGS. 1 and 8 to 16 inclusive. The filter unit supporting assembly D comprises an outer tube 50 whose free end is designed to support an adapter on which the filter unit to be cleaned is mounted. The outer tube 50 contains an interior tube 51 of smaller diameter and which together define an exterior flow passage 50' and an interior flow passage 51', as shown in FIGS. 8-16. One end of the outer and inner tubes 50 and 51 extends into a manifold cylinder 53 adjustably mounted on a supporting knuckle 52. The manifold cylinder 53 has a longitudinally extending bore pocket 53' therein whose outer end is closed by a screw cap 54. The adjacent ends of the outer tube 50 and inner tube 51 extend into the manifold cylinder 53 and the flow passage 50' defined therebetween communicates with the bore pocket 53'. The bore pocket 53' communicates with a tubular nipple 53'' which projects through the cylindrical wall of the manifold cylinder 53. The inner tube 51 extends through the bore pocket 53' and is in flow communication with a second tubular nipple 53''' which also projects through the cylindrical wall of the manifold cylinder 53.

The manifold cylinder 53 is mounted for ninety degree rotation on the supporting knuckle 52 which is fixed to the end of an arm 56 which is preferably rectangular in cross-section. The knuckle member 52 presents a substantially circular flange portion 52' which telescopes over a reduced diameter neck portion 55 extending from the adjacent end of the manifold cylinder 53. The neck portion 55 of the manifold cylinder 53 as shown in FIGS. 11, 12 and 13 presents a pair of diametrically opposed arcuate grooves 55' which have an angular length of slightly more than ninety degrees, and which define diametrically opposed lug portions 55'' therebetween, each having an arcuate length of slightly less than ninety degrees. A pair of diametrically opposed pins 52'' extends through the flange portion 52' of the knuckle member 52 and into the arcuate grooves 55' defined between the lug portions 55'' of the manifold cylinder 53. The abutment pins 52'' are so positioned as to permit rotation of the manifold cylinder 53 through an angle of approximately ninety degrees, so that the filter supporting tube 50 and the inner tube 51 contained therein may be swung into horizontal position and into the bath of cleaning fluid, or into a vertical position to lift the filter unit supported thereby out of the cleaning fluid, as diagrammatically illustrated in FIG. 9.

The supporting arm 56 may be adjustably supported in fixed position by means of a bracket 57 having a base portion 57' which may be secured as by suitable screws to the adjacent shelf portion of the tank 66 which contains the cleaning fluid as shown in FIGS. 1 and 8. A bracket arm 58 extends from the base portion 57' of the supporting bracket 62 and is provided with a rectangular hole 58' in which the supporting arm 56 may slide. A manually manipulated locking nut 59 has a threaded shank portion 59' which extends into a threaded bore in the end of the bracket arm 58 and which may be manipulated into locking abutment against the supporting arm 56. Thus, the supporting arm 56 may be reciprocated through the rectangular hole 58' of the bracket arm 58 and fixed in any desired adjustment position to thereby rigidly hold the filter unit supporting tube 50 and the filter unit supported thereon in operative relation to the working face 7 of the vibrator assembly.

Various forms of filter unit supporting adapters may be used to provide a cleaning fluid flow connection between the filter unit to be cleaned and the flow passages 50' and 51' of the tube 50. The adapter 60 as shown in FIGS. 8 and 9 is designed to support a tubular filter unit F as previously described. The adapter 60 may be made of suitable plastic or rubber which presents a tubular body portion 60' from which a circular skirt 60" extends which is designed for insertion into the end ring j of the tubular filter unit F in a manner to provide a leak-proof seal therebetween. The tubular body portion 60' is designed to loosely telescope over the outer tube 50 and may be laterally moved and rotated thereon. To prevent the escape of cleaning fluid between the interior bore of the body portion 60' and the outer tube 50, a pair of resilient sealing rings 60''' may be provided which are set within a pair of receiving grooves extending circumferentially around the inner bore of the body portion 60' and which have sealing contact with the outer tube 50. The adapter 60 and the tubular filter unit F supported thereby may be laterally moved along the outer tube 50 during the cleaning operation, as indicated by the phantom lines of FIG. 8, to thereby place the adjacent ends of the outer and inner tubes 50 and 51 in any desired position with respect to the inner surface of the tubular filter unit F.

Where a non-tubular filter unit is to be cleaned, such as the relatively flat or cup-shaped filter unit F' shown in FIGS. 14, 15 and 16, a modified form of adapter 60a may be provided which may comprise an angular coupling 61, made of rubber or metal, which rotatably supports a funnel member 63 on which the filter unit F' is mounted. The angular coupling 61 presents a straight body section 61' and an angular body section 61". The straight body section 61' telescopes over the outer end of the fluid supply tube 50 and is provided with a pair of internal O-rings 61''' which insure a substantially liquid-tight seal between the straight body section 61' and the cleaning fluid supply tube 50, and yet permits lateral adjustment and frictional rotation of the angular coupling 61 with respect thereto.

Where a relatively flat or disc-shaped filter unit F' is to be cleaned, the reinforcing rim r of the filter unit F' is mounted on a funnel 63 which has a tubular neck section 63' designed to telescope into the end of the angular section 61" of the coupling 61. The angular section 61" may contain a bearing assembly 62 which seats in a pocket formed therein so that the funnel 63 may be rotated. A pair of resilient sealing rings 62' positioned in the pocket at both ends of the bearing assembly 62, provide a leak-proof connection between the tubular neck section 63' of the funnel 63 and the angular section 61" of the coupling 61.

The flared upper end of the funnel 63 may be provided with an upstanding flange 63" which may be embraced by a resilient gasket ring 64 made of rubber or the like and which presents a seating shoulder 64' on which the rim r of the filter unit F' snugly seats, and an inturned lip portion 64" designed to overhang the upper edge of the rim r of the filter unit F'. The gasket ring 64 is so shaped as to provide a substantially leak-proof seal with the rim r of the filter unit. The coupling 61 and funnel 63 of the adapter 60a shown in FIGS. 14–16 are shaped and dimensioned to support one surface of the filtering screen f of the filter unit F' in close proximity to the working face 7 of the connecting body 5 of the vibrator assembly as indicated in FIG. 16.

The positioning of the filtering screen f in minutely spaced relation to the working face of the vibrator assembly A as shown in FIG. 16 is also effected by telescopic adjustment of the straight section 61' of the coupling 61 on the cleaning fluid supply tube 50, and by a lateral adjustment of the supply tube 50 effected by a longitudinal adjustment of the supporting arm 56 of the assembly D, which is then fixed in the desired adjusted position by the hand manipulated set screw 59. The funnel 53 may be rotated on its bearing assembly 62 to place progressive cleaning site areas of the filtering screen f directly under the working face 7 of the vibrator assembly, until the entire surface of the filter screen f has been scanned by the vibrating working face 7. Complete scanning coverage of the filter screen f may be assured by lateral telescoping adjustment of the coupling 61 on the liquid supply tube 50 and by rotational movement of the funnel 63 which supports the filter unit F.

*Cleaning Fluid Circulation System*

A cleaning fluid circulation system E, as shown in FIG. 18, is provided which embraces means which can be manipulated to drive cleaning fluid under pressure through the flow passage 50' and adapter 60 or 60a with sufficient pressure to drive the cleaning fluid outwardly through the filtering screen f of the tubular filter unit F or flat filter unit F'. Outward flow of cleaning fluid through the filtering screen f of the filter unit F or F' proceeds while a localized column of cleaning fluid is under hyper-intense cavitational action as engendered by the vibrating working face 7 of the vibrator assembly A. Seventy-five to ninety percent of the particle debris can thus be dislodged and outwardly removed from the filtering screen f of the filtering unit, and which particle debris will then be deposited in the cleaning fluid bath 65 in which the filter unit is immersed.

To remove any remaining particle debris from the filtering screen f of the filter unit F or F', the cleaning fluid circulation system E is provided with means which can be manipulated to apply suction force to the liquid passage 50' and adapter 60 or 60a to thereby cause a counter-flow of the cleaning fluid through the filtering screen f of the filter unit from the exterior to the interior surface thereof. This backwash or counter-flow movement of the cleaning fluid proceeds while a localized column of cleaning fluid is under hyper-intense cavitational action at the cleaning site area of the filter unit, as engendered by the vibrating working face 7 of the vibrator assembly. The remaining particle debris thus removed from the filter unit is withdrawn through the adapter 60 or 60a and in a reverse flow through the flow passage 50'.

The filter unit cleaning operation takes place while the filter unit is mounted on the adapter 60 or 60a and adjustably supported on the outer tube 50 of its supporting assembly D, and while fully immersed in a bath 65 of cleaning fluid contained in a tank 66 and forming a part of the apparatus as shown in FIGS. 1 and 18. A cleaning fluid is used which is a solvent to oils and greases, which is substantially free of entrained water, and has a minimum corrosive effect on the metals or materials from which the apparatus is constructed. The cleaning fluid should also be compatible with the gas or liquid from which the particle debris, entrained in the filter unit, has been removed. Highly refined kerosene, such as an upper kerosene cut, and sold under the name of "Varsol," has been found to be satisfactory. Numerous other cleaning fluids may be used which possess high solvent capabilities and low corrosion characteristics, which are compatible with the gas or liquid from which the filter entrained particle debris has been removed, and which are substantially free of entrained water. The cleaning fluid must obviously be in liquid form, and adapted to be cavitated by the application of ultrasonic vibrations thereto.

The cleaning fluid tank 66 should be of sufficient area and depth to insure complete immersion of the filtering unit and provide adequate room for manipulating the filter unit. The cleaning fluid tank 66 has a flow tube 67 connected to the bottom wall of the tank 66 as by suitable fitting 67'. The flow tube 67 is also connected to the casing 68' and one of the ports of a four port and two-way reversing valve 68 as shown in FIGS. 1, 18, 19 and 20. Three additional cleaning fluid flow tubes 70, 71 and 72 are connected to the other three ports of the casing 68' of the reversing valve 68 in a manner so that the four flow tubes 67, 70, 71 and 72 enter the reversing valve casing 68' at four equally spaced points. The interior of the reversing valve casing 68' contains a flow guide block 69 fixed to an axial shaft 69' which is journaled in the side walls of the casing 68' and whose elongated outer end is operatively connected to an adjusting arm 69'' secured to the projecting end thereof as shown in FIGS. 1 and 18. The adjusting arm 69'' may be connected to a manipulating rod 69''' whose lower end is connected to a foot pedal 68a as shown in FIG. 1, by means of which the flow guide block 69 may be adjusted as shown in FIG. 19 so that cleaning fluid will flow from tube 70 and out through tube 71, and will also flow from tube 67 out through tube 72. By an alternative adjustment of the foot pedal 68a, the control guide block 69 is adjusted as shown in FIG. 20 so that cleaning fluid will then flow from tube 70 out through tube 67 and will also flow from tube 71 through tube 72 connected to the suction side of a centrifugal pump 73.

At the start-up of the cleaning operation, the tank 66 is substantially filled with cleaning fluid to provide a cleaning fluid bath 65 as shown in FIG. 18, and the flow guide block 69 of the reversing valve 68 is adjusted by the control pedal 68a to the position shown in FIG. 19. Cleaning fluid will then flow from the tank 66 through line 67 and line 72 to the suction side of the centrifugal pump 73, and thus serve to prime the pump. The pump 73 is driven by a motor 74 from current supplied by current line 74'. An on and off switch 74'' is placed in current supply line 74' to throw the motor 74 into and out of operation as shown in FIG. 18. The current control switch 74'' is operated by remote control push buttons 74a and has a light bulb 74b associated therewith which is mounted on the instrument panel 107 of the apparatus as shown in FIG. 1. The light bulb 74b lights up when the motor switch 74'' is in closed position, thereby indicating that the motor 74 and centrifugal pump 73 are in operation.

Cleaning fluid under pressure is discharged from the pressure side of centrifugal pump 73 through fluid supply tube 75 which has a T-coupling 75' therein which is connected to a branch line 76' which leads to a sampling valve 77. The sampling valve has a control knob 77a and a spigot 77b mounted on the instrument panel 107 of the apparatus as shown in FIG. 1. By manipulating the control knob 77a, the sampling valve 77 can be opened and samples of the cleaning fluid can be withdrawn from its spigot 77b and checked for cleanliness. The T-coupling 75' is also connected to a main outlet tube 76 which leads to a flow regulator valve 78 having a control knob 78a mounted on the instrument panel 107 as shown in FIG. 1, and by means of which the volume flow of the cleaning liquid passing therethrough may be controlled. The flow regulator valve 78 is connected to a flow meter 79 as shown in FIGS. 1 and 18 by means of a connecting tube 78' extending between the regulator valve 78 and the bottom end of the flow meter 79. The flow meter 79 may be of the ball type, and has a window through which the position of the metering ball 79' may be observed and the volume flow of cleaning fluid measured on an adjacent scale in terms of gallons per minute. The flow meter 79 may be mounted on the instrument panel 107 of the apparatus as shown in FIG. 1, and thus made readily visible to the operator engaged in cleaning a filter unit.

The cleaning fluid is discharged from the upper end of the flow meter 79 into an output tube 79'' which leads to a cleaning fluid filtering device 80 as shown in FIGS. 1 and 18. The cleaning fluid filtering device 80 operates to remove particle debris which has been removed from the filter unit being cleaned and mixed with the cleaning fluid bath 65 contained in the tank 66, and then pumped by the centrifugal pump 73 along with the cleaning fluid to the cleaning fluid filtering device 80. The discharge side of the cleaning fluid filtering device 80 is connected to line 70 which leads to the reversing valve 68. The cleaning fluid filtering device 80 has a differential pressure sensitive element 80' associated therewith which measures the resistance to fluid flow through the filtering device 80 and which has a switch connection to an electric wire 80'' which leads to an electric light bulb 80a. When flow resistance of the cleaning fluid passing through the filtering device 80 has reached a certain permitted maximum, the resultant differential in fluid pressure flowing through the filter device 80, activates the pressure sensitive element 80' whose switch is then tripped, which will indicate by the lighting of the light bulb 80a that the filtering device 80 is clogged with debris and should be cleaned. The light bulb 80a may be mounted on the instrument panel 107 of the apparatus as shown in FIG. 1 and in convenient position for observation by the operator of the apparatus. Before opening the filtering device 80 for cleaning, the valve 78 is closed by manipulating its control knob 78a, and the pump driving motor 74 is also shut down by manipulating the switch push buttons 74a. The extent of particle debris fouling of the cleaning fluid may also be observed by taking a sample thereof withdrawn through the sampling valve spigot 77b.

When the reversing valve 68 is set to the flow position shown in FIG. 19, pressurized cleaning fluid flows through tube 70 to the reversing valve 68 and thence through tube 71. Tube 71 is connected to the tubular nipple 53'' of the manifold cylinder 53 of the filter unit supporting assembly D as shown in FIG. 9, and from which the cleaning fluid flows under pressure through the outer passage 50' and adapter 60 or 60a and to one side of the filter screen f of the filter unit F or F' being cleaned. The pressurized cleaning fluid flowing through the passage 50' and adapter 60 or 60a to one side of the filter screen f exerts outward pressure on the particle debris embedded in the corrugated filtering element f of the filter unit being cleaned. A substantial part of the particle debris is loosened from the filter element f by the combined forces of hyperintense cavitational action applied to the limited column of cleaning fluid as engendered by the vibrating working face 7 of the vibrator assembly, and the outward pushing pressure of cleaning fluid applied to the particle debris as enmeshed in the pores of the filter screen f of the filter unit being cleaned.

Loosening and outward removal of the particles in the clogged pores of the corrugated filter screen f of the filter unit is to a major degree effected by the combined forces of hyper-intense cavitational action of a limited column of cleaning fluid which is under, adjacent to and below the working face 7 of the vibrator assembly A, and the pushing pressure exerted by the pressurized cleaning fluid attempting to outwardly escape through the minute pores of the filtering screen f. The pressure exerted by the cleaning fluid applied to one face of the filter screen f may be controlled by manipulating the control knob 78a of the flow regulator valve 78, and the pressure thus adjusted in accordance with the micron size of the pores in the filtering element f. During this cleaning operation, the filter unit supporting adapter 60 or 60a may be rotated and reciprocated along the outer tube 50 to place progressive cleaning site areas thereof in adjacent relation to the working face 7 of the vibrator assembly A.

When the filter unit has been cleaned to a major degree by the combined action of cleaning fluid cavitation and fluid pressure applied to opposite sides of the filtering screen f as above described, the flow guide block 69 of the reversing valve 68 is adjusted by manipulation of the foot pedal 68a to the position shown in FIG. 20 so that cleaning fluids flows from tube 70 through the reversing valve 68 and through tube 67 and into the bottom of the cleaning fluid tank 66. Suction will thereby be created in flow tube 71 since it is open to line 72 and the suction side of the centrifugal pump 73. The suction thus created in the tube 71 is transmitted to nipple 53" and flow passage 50' of the filter unit supporting assembly D, which will result in the withdawal of cleaning fluid through tube passage 50' and from the adapter 60 or 60a, thereby applying fluid suction to the adapter side of the filtering screen f.

The suction removal of cleaning fluid from the adapter 60 or 60a will result in a reverse flow of cleaning fluid through the filtering screen f from the outer side to the adapter side thereof, and with resultant exertion of suction pressure on the particle debris which still clogs the remaining filter pores. This reverse flow of cleaning fluid through the pores of the corrugated filter screen f, augmented by the hyper-intense cavitational action of a localized column of cleaning fluid as generated by the vibrating working face 7 of the vibrator assembly A, will loosen any remaining debris particles which have become lodged in the filter pores and can best be removed by inward withdrawal thereof. During this cleaning operation, the filter unit is rotated and longitudinally reciprocated along the outer tube 50 of the cleaning unit supporting assembly D, and this second stage cleaning operation continued until the filter unit F is fully cleaned to acceptable re-use standards.

The instrument panel 107 may also be provided with a time clock 109 which can be set to ring when a predetermined time interval has elapsed, and which provides a useful means of gauging the time interval during which the filtering screen f is under pressure and under suction cleaning.

The cleaning fluid circulation system E may also be provided with means in association with the inner tube 51 of the filter unit supporting assembly D for establishing and metering suction applied to the adapter side of the immersed filter unit when the vibrator assembly A is not in operation, and which provides an indication as to the extent to which the filter unit has been cleaned. For example, a clean filter unit of known pore size would first be immersed in the cleaning fluid bath and the pressure drop between the opposite surfaces of its filter screen noted and registered as the minimum optimum pressure drop for a clean filter of this particular type. A used filter of the same type and with the same size pores would then be immersed in the cleaning fluid and the pressure drop between the opposite surfaces of its filtering screen noted. If this noted pressure drop of the previously used filter unit did not substantially exceed the known minimum optimum pressure drop indicated by the clean filter of this same type, then the assumption can be made that substantially all particle debris had been removed from the previously used filter unit, and that the previously used filter unit had been acceptably cleaned for re-use. The means for establishing and metering suction applied to the adapter side of the immersed filter unit may be connected to a fluid level tube 97, as shown in FIGS. 8, 9 and 18, which is connected to the nipple 53''' associated with the manifold cylinder 53 and which leads to the inner tube 51 of the filter unit supporting assembly D.

Operations

While the practical application of this invention has been heretofore explained in connection with the cleaning of porous filter screens of extremely small pore size, this invention finds more general application to the cleaning of numerous types of intricate articles and objects which defy satisfactory cleaning by immersion in a vibrating bath of cleaning fluid as heretofore practiced. As is evident from the above disclosure, the method and apparatus of this invention can be advantageously and effectively employed in the cleaning of a wide range of intricate objects and articles, such as bearing assemblies, clock and watch works, instrument assemblies and like devices whose intricate working elements present minute pores, cavities, passages or interstices containing impacted debris or other foreign material which must be thoroughly removed.

In accordance with this invention, the object to be cleaned is supported in the cleaning fluid bath by an adapter which is connected to a cleaning fluid circulation system, and by means of which cleaning fluid under controlled pressure or suction is applied to one face of the adapter-supported object, while the opposite face is subjected to the hyper-intense cavitational action of a limited column of cleaning fluid. The cavitational action produced is of such intensity as to penetrate into, and loosen the debris impacted within the pores, cavities, passages and interstices of the object, while cleaning fluid pressure or cleaning fluid suction, or alternating cleaning fluid pressure and cleaning fluid suction, is applied to the opposite face of the object to effectuate the ejection or withdrawal of the debris or foreign material therefrom. The thorough cleaning of all the pores, cavities, passages and interstices of the object is thus effected by the combined action of cavitational, pressure and/or suction forces.

The object supporting adapter may be made in numerous shapes and forms as the form and shape of the object to be cleaned may require, of which the adapters 60 and 60a illustrated in FIGS. 8, 9, 14, 15 and 16 are exemplifications.

It will also be appreciated that the working face 7 of the vibrator unit 1 of the vibrator assembly A should have a shape and area best suited to the shape and form of the adjacent face or surface of the object to be cleaned. Where the face or surface area of the object to be subjected to cavitational action is relatively small, the working face 7 of the vibrator unit 1 may have a substantially equivalent area, in which case the object need not be manipulated in scanning relation to the vibrating working face. Where the area of the object face or surface to be cavitated is relatively large, or is irregular or arcuate in shape, the object supporting adapter and its mounting assembly D should be so constructed as to permit manipulation of the adapter-supported object, so that the entire surface of the object may be progressively manipulated into close proximity to the working face 7 of the vibrator assembly A to effectuate complete cavitational scanning thereof. Where the object to be cleaned is of such size or dimension that it cannot be conveniently manipulated, the vibrating assembly A may be adjustably mounted so that its working face 7 may be manipulated into cavitational scanning relation to progressive adjacent areas of the object face or surface.

While the vibrator assembly A may be designed to longitudinally vibrate the working face 7 of its vibrator unit at any desired frequency in the order of from five to fifty kc. per second, it has been found that vibrations in the ultrasonic frequency range of fifteen to thirty kc. will in most cases produce the most effective hyper-intense cavitational cleaning action. In this connection, it will be appreciated that the vibrator unit is constructed, proportioned and designed to vibrate at resonance at the preferred frequency of operation, and that the generating system C is so designed and tuned as to operate at the optimum resonance frequency of the vibrator unit 1.

In a frequency range of fifteen to thirty kc., the working face 7 of the vibrator assembly A will longitudinally vibrate at an amplitude in the order of aproximately one-half thousandths to a maximum of approximately three-thousandths of an inch. The adjacent face or surface of the object to be cleaned, should be positioned in minutely spaced relation to the working face 7 of the vibrator assembly, but without impact contact therewith. To effectuate the most intense and effective cavitations of a limited column of cleaning fluid extending longitudinally from the working face 7, the adapter and its mounting assembly D is adjusted to position the cleaning site area of the object surface in the order of one to forty-thousandths of an inch from the working face 7 when the working face 7 is not vibrating.

It will be appreciated that the vibrator unit 1 is so designed that its working face 7 is at an antinode of longitudinal vibration, and vibrates at maximum amplitude. The suport legs 17 of the vibrator assembly are so made that the working face 7 of the vibrator unit is maintained in close proximity to, but does not strike the object to be cleaned, and with sufficient space therebetween for the escape of debris which is dislodged from the pores or cavities of the object. The speed of travel of acoustical or compression waves in the cleaning fluid is a known factor, and is dependent upon the frequency of vibration as well as the acoustical transmission characteristics of the cleaning fluid. Since the cleaning fluid in contact with the working face is at an anti-node of vibration and vibrates at maximum longitudinal amplitude in a direction normal to the working face 7, and since the cleaning fluid spaced one-quarter wave length from the working face 7 is at a node of longitudinal vibration of the cleaning fluid, the cleaning fluid layer which is directly adjacent to the working face 7 and confined within the first quarter wavelength, exhibits the most intense longitudinal vibration in a direction normal to the working face. Accordingly, the most intense cavitational cleaning action on the debris-laden pores and cavities of the object is attained when the object to be cleaned is so closely positioned with respect to the working face 7, that the full depth of its cavities, pores or channels are embraced within the first quarter wavelength layer of cleaning fluid.

From the above disclosure, it will be appreciated that the greatest intensity of cavitation will occur in that column of cleaning fluid which is directly under the working face 7, and that the cleaning fluid laterally surrounding the working face 7 will be cavitated at substantially less intensity when the working face 7 is vibrated. It will also be appreciated that the working face 7 should be fully immersed in the cleaning fluid bath, but should in no case be immersed deeper than the projecting reduced section 5″ of the vibrator unit 1.

The power input required to vibrate the vibrator unit 1 of the vibrator assembly A is dependent upon the total mass of the vibrator unit 1, the area of its working face 7, the frequency at which it is to be vibrated and other factors. Under these conditions, the voltage input may vary from a low of approximately 100 volts to as high as 5,000 volts or higher.

The amplitude pick-up device 25 and associated amplitude monitoring system B provides a convenient means for determining the amplitude of vibration of the connecting body 5 and its working face 7, whose preferred resonance amplitude is a known factor designed into the vibrator unit 1. The operating amplitude is conveniently revealed to the operator by the amplitude indicator 30c mounted on the instrument panel 107, and when the operating amplitude of the connecting body 5 drops below its optimum resonance amplitude, the power generating circuit C may be tuned by adjusting the control knob 44b to thereby restore the vibrating connecting body 5 to optimum resonance frequency.

The pressure and/or suction force delivered through the adapter to the adapter-supported side of the object to be cleaned may be adjusted in intensity by an appropriate adjustment of the valve 78, effected by an appropriate manipulation of element 78a. It will be noted, however, that only cleansed cleaning fluid is pressure injected into the adapter 60 or 60a during operation of the cleaning fluid flow system E, since circulating cleaning fluid is under constant cleansing action by the cleaning fluid filtering device 80. When the cleaning fluid filtering device 80 has become excessively clogged with particle debris drawn from the cleaning fluid stream flowing therethrough, such clogging would be indicated by the light bulb 80a on the instrument panel 107. When this occurs, the cleaning fluid circulation pump 73 is shut down, the filtering device 80 is replaced, and at this time it may also be desirable to supply a fresh cleaning fluid bath to the tank 66 and the cleaning fluid circulation system.

Operator experience in the use of this apparatus will reveal the time required by a particular operator to effect the cleaning of a particular type of porous object, or the time when a particular type of porous object should be subjected to cleaning fluid pressure and/or alternate suction to effect thorough cleaning thereof. The cleaning time interval thus established, may be indicated to the operator when cleaning subsequent porous objects of the same type, by an appropriate setting of the time clock 109.

From the above disclosure, it is evident that the apparatus of this invention embraces an inter-related series of devices and instruments compactly contained in or assembled on a transportable cabinet, which can be advantageously employed for effectively and thoroughly cleaning numerous types and kinds of intricate objects and articles, and the removal of impacted debris from the minute pores, cavities, crevices, passages, channels and interstices thereof, and which could not be adequately and thoroughly cleaned by known methods and apparatus. It will be appreciated that numerous modifications and adaptations of the above-described method and apparatus may be made by the skilled in the art from the teachings of this invention, to effectuate the thorough cleaning of particular intricate objects whose crevice defining elements, parts and mechanisms are so complicated, delicate or intricate, as to defy effective cleaning by any other method.

While certain novel features of this invention have been disclosed herein and are pointed out in the claims, it will be understood that various omissions, substitutions, and changes may be made by those skilled in the art, without departing from the teachings of this invention.

What is claimed is:

1. The method of removing impacted debris entrained in the minute cavities of a surface to be cleaned which includes; immersing the surface to be cleaned in a cleaning fluid; immersing in said cleaning fluid the working face of a vibrator assembly which is designed and powered to vibrate its working face at an amplitude in the order of one-half to three-thousandths of an inch and at a frequency in the range of five to fifty kilocycles per second; adjusting the relative position of said fluid immersed working face with respect to the fluid immersed surface to be cleaned so that said working face is in close proximity to but does not physically contact the surface to be cleaned when vibrated; energizing said vibrator assembly to vibrate its working face at a frequency which will generate a column of compressional waves in said cleaning fluid of such character that the first quarter of said compressional waves extend substantially normal to said working face and are of sufficient length to more than fully penetrate the full depth of the debris impacted surface cavities defined within a column area corresponding to the area of said working face, and whereby the impacted debris containing cavities within said column area will be subject to the intense cavitational action of the cleaning fluid embraced within said first quarter wavelength zone; and continuing said cavitational action until the impacted debris has been dislodged from the surface cavities.

2. The method of removing impacted debris from the minute cavities of a surface to be cleaned which includes; immersing the surface to be cleaned in a cleaning fluid; immersing in said cleaning fluid the working face of a vibrator assembly which is designed and powered to vibrate its working face at an amplitude in the order of one-half to three-thousandths of an inch and at a frequency in the range of five to fifty kilocycles per second; adjusting the relative position of said fluid immersed working face with respect to the fluid immersed surface to be cleaned so that said working face is in close proximity to but does not physically contact the surface to be cleaned when vibrated; energizing said vibrator assembly to vibrate its working face at a frequency which will generate a column of compressional waves in said cleaning fluid of such character that the first quarter of said compressional waves extend substantially normal to said working face and are of sufficient length to more than fully penetrate the full depth of the debris impacted surface cavities defined within a column area corresponding to the area of said working face, and whereby the impacted debris containing cavities within said column area will be subjected to the intense cavitational action of the cleaning fluid embraced within said first quarter wavelength zone; and establishing relative movement between the surface to be cleaned and the vibrating working face of the vibrator assembly to thereby present progressive surface areas in close proximity to the vibrating working face and to the intense cavitational action of the limited column of cleaning fluid until the entire surface to be cleaned has been scanned by said vibrating working face and the impacted debris has been dislodged from the cavities thereof.

3. The method of removing entrained particle debris from the minute pores of a porous object which includes; immersing the object in a bath of cleaning fluid; immersing in said cleaning fluid the working face of a vibrator assembly which is designed and powered to vibrate its working face at an amplitude in the order of one-half to three-thousandths of an inch and at a predetermined frequency in the range of five to fifty kilocycles per second; adjusting the relative position of said fluid immersed working face with respect to a porous surface of the object so that said working face is in close proximity to but does not physically contact the object when vibrated; energizing said vibrator assembly to vibrate its working face at a frequency which will generate a column of compressional waves in said cleaning fluid of such character that the first quarter of said compressional waves extend substantially normal to said working face and are of sufficient length to more than fully penetrate the full depth of the adjacent pores of the object defined within a column area corresponding to the area of said working face, and whereby the debris containing pores within said column area will be subjected to the intense cavitational action of the cleaning fluid embraced within said first quarter wavelength zone; and continuing said cavitational action until the particle debris has been dislodged from the pores of the object.

4. The method of removing entrained debris from the minute pores of a porous object which includes; immersing the porous object in a cleaning fluid; immersing in said cleaning fluid the working face of a vibrator assembly which is designed and powered to vibrate its working face at an amplitude in the order of one-half to three-thousandths of an inch and at a frequency in the range of five to fifty kilocycles per second; adjusting the relative position of said fluid immersed working face with respect to a porous surface of the object so that said working face is in close proximity to but does not physically contact the object when vibrated; energizing said vibrator assembly to vibrate its working face at a frequency which will generate a column of compressional waves in said cleaning fluid of such character that the first quarter of said compressional waves extend substantially normal to said working face and are of sufficient length to more than fully penetrate the full depth of the adjacent pores of the object defined within a column area corresponding to the area of said working face, and whereby the debris containing pores within said column area will be subjected to the intense cavitational action of the cleaning fluid embraced within said first quarter wavelength zone; and establishing relative movement between the porous object to be cleaned and the vibrating working face of the vibrator assembly to thereby present progressive porous areas of the object in close proximity to the vibrating working face and to the intense cavitational action of the limited column of cleaning fluid until the pores of the object have been scanned by said vibrating working face and the impacted debris has been dislodged from the pores thereof.

5. The method of removing entrained particle debris from the minute pores of a porous filter unit which includes; immersing the filter unit in a bath of cleaning fluid; immersing in said cleaning fluid the working face of a vibrator assembly which is designed and powered to vibrate its working face at an amplitude in the order of one-half to three-thousandths of an inch and at a predetermined frequency in the range of five to fifty kilocycles per second; adjusting the relative position of said fluid immersed working face with respect to a porous surface of the filter unit so that said working face is in close proximity to but does not physically contact the filter unit when vibrated; energizing said vibrator assembly to vibrate its working face at a frequency which will generate a column of compressional waves in said cleaning fluid of such character that the first quarter of said compressional waves extend substantially normal to said working face and are of sufficient length to more than fully penetrate the full depth of the adjacent pores of the filter unit defined within a column area corresponding to the area of said working face, and whereby the debris containing pores of the filter unit within said column area will be subjected to the intense cavitational action of the cleaning fluid embraced within said first quarter wavelength zone; and continuing said cavitational action until the particle debris has been dislodged from the pores of the filter unit.

6. The method of removing impacted debris from the minute pores of a porous filter unit which includes; immersing the filter unit in a bath of cleaning fluid; immersing in said cleaning fluid the working face of a vibrator assembly which is designed and powered to vibrate its working face at an amplitude in the order of one-half to three-thousandths of an inch and at a frequency in the range of five to fifty kilocycles per second; adjusting the relative position of said fluid immersed working face with respect to a porous surface of the immersed filter unit so that said working face when vibrating is in close proximity to but does not physically contact the filter unit; energizing said vibrator assembly to vibrate its working face at a frequency which will generate a column of compressional waves in said cleaning fluid of such character that the first quarter of said compressional waves extend substantially normal to said working face and are of sufficient length to more than fully penetrate the full depth of the debris impacted pores defined within a column area corresponding to the area of said working face, and whereby the impacted debris containing pores within said column area will be subjected to the intense cavitational action of the cleaning fluid embraced within said first quarter wavelength zone; and establishing relative movement between the porous surface of the filter unit and the vibrating working face of the vibrator assembly to thereby present progressive porous surface areas in close proximity to the vibrating working face and to the intense cavitational action of the limited column of cleaning fluid until the entire porous surface of the filter unit has been scanned by said vibrating working face and the impacted debris has been dislodged from the pores thereof.

7. The method of removing impacted debris entrained in the minute pores of a porous filter unit to thereby cleanse the same for reuse, which includes; immersing the filter unit in a bath of cleaning fluid; immersing in said cleaning fluid the working face of a vibrator assembly which is designed and powered to vibrate its working face at an amplitude in the order of one-half to three-thousandths of an inch and at a frequency in the range of five to fifty kilocycles per second; adjusting the relative position of said fluid immersed working face with respect to a porous surface of the fluid immersed filter unit so that said working face when vibrated is in close proximity to but does not physically contact the surface of the filter unit; energizing said vibrator assembly to vibrate its working face at a frequency which will generate a column of compressional waves in said cleaning fluid of such character that the first quarter of said compressional waves extend substantially normal to said working face and are of sufficient length to more than fully penetrate the full depth of the debris impacted pores of the filter unit as defined within a column area corresponding to the area of said working face, and whereby the impacted debris containing pores within said column area will be subjected to the intense cavitational action of the cleaning fluid embraced within said first quarter wavelength zone; and continuing said cavitational action until the impacted debris has been dislodged from the pores of the filter unit.

8. The method of removing entrained particle debris from the minute pores of a porous object which includes; immersing the porous object in a bath of cleaning fluid, placing the relatively flat working face of a vibrator assembly in closely adjacent relation to one surface of the porous object, vibrating the working face at high frequency and relatively small amplitude in a direction normal to said surface to thereby produce intense cavitation of a limited column of cleaning fluid which penetrates the adjacent pores of the object, and substantially simultaneously applying cleaning fluid pressure to the opposite surface of the object to thereby exert pushing pressure against pore entrained debris particles in a direction toward the vibrating working face of the vibrator assembly until the particle debris has been dislodged and expelled from the pores of the object by the combined action of cavitational and pressure forces.

9. The method of removing entrained particle debris from the minute pores of a porous filter unit to thereby cleanse the same for re-use, which includes; immersing the filter unit in a bath of cleaning fluid, placing the relatively flat working face of a vibrator assembly in closely adjacent relation to one surface of the filter unit, vibrating the working face at high frequency and relatively small amplitude in a direction normal to said surface to thereby produce intense cavitation of a limited column of cleaning fluid which penetrates the adjacent pores of the filter unit, and substantially simultaneously applying cleaning fluid pressure to the opposite surface of the filter unit to thereby exert pushing pressure against pore entrained debris particles in a direction toward the vibrating working face of the vibrator assembly until the particle debris has been dislodged and expelled from the pores of the filter unit by the combined action of cavitational and pressure forces.

10. The method of removing entrained particle debris from the minute pores of a porous object, which includes; immersing the porous object in a bath of cleaning fluid, placing the relatively flat working face of a vibrator assembly in closely adjacent relation to one surface of the porous object, vibrating the working face at high frequency and relatively small amplitude in a direction normal to said surface to thereby produce intense cavitation of a limited column of cleaning fluid which penetrates the adjacent pores of the object; establishing relative lateral movement between the vibrating working face of the vibrator assembly and the adjacent surface of the object while the working face is maintained in close proximity to the adjacent surface of the object, to thereby subject progressive limited portions of the porous object to the intense cavitational action of limited columns of cleaning fluid which penetrate adjacent pores thereof; and substantially simultaneously applying cleaning fluid pressure to the opposite surface of the porous object to thereby exert pushing pressure against pore entrained debris particles in a direction toward the vibrating working face of the vibrator assembly until the particle debris has been dislodged and expelled from substantially all of the pores of the object by the combined action of cavitational and pressure forces.

11. The method of removing entrained particle debris from the minute pores of a porous filter unit, which includes; immersing the filter unit in a bath of cleaning fluid, placing the relatively flat working face of a vibrator assembly in closely adjacent relation to one surface of the filter unit, vibrating the working face at high frequency and relatively small amplitude in a direction normal to said surface to thereby produce intense cavitation of a limited column of cleaning fluid which penetrates the adjacent pores of the filter unit; establishing relative lateral movement between the vibrating working face of the vibrator assembly and the filter unit while the working face continues to be maintained in close proximity to said surface of the filter unit, to thereby subject progressive limited portions of the filter unit to the intense cavitational action of limited columns of cleaning fluid which penetrate adjacent pores of the filter unit; and substantially simultaneously applying cleaning fluid pressure to the opposite surface of the filter unit to thereby exert pushing pressure against pore entrained debris particles in a direction toward the vibrating working face of the vibrator assembly until the particle debris has been dislodged and expelled from substantially all pores of the filter unit by the combined action of cavitational and pressure forces.

12. The method of removing entrained particle debris from the minute pores of a porous object which includes; immersing the porous object in a bath of cleaning fluid, placing the relatively flat working face of a vibrator assembly in closely adjacent relation to one surface of the porous object, vibrating the working face at high frequency and relatively small amplitude in a direction normal to said surface to thereby produce intense cavitation of a limited column of cleaning fluid which penetrates the adjacent pores of the object, and substantially simultaneously applying fluid suction to the opposite surface of the porous object to thereby exert a suction force on pore entrained debris particles in a direction away from the vibrating working face until the particle debris has been dislodged and withdrawn from substantially all pores of the object by the combined action of cavitation and suction forces.

13. The method of removing entrained particle debris from the minute pores of a porous filter unit, which includes; immersing the filter unit in a bath of cleaning fluid, placing the relatively flat working face of a vibrator assembly in closely adjacent relation to one surface of the filter unit, vibrating the working face at high frequency and relatively small amplitude in a direction normal to said surface to thereby produce intense cavitation of a limited column of cleaning fluid which penetrates the adjacent pores of the filter unit, and substantially simultaneously applying fluid suction to the opposite exterior surface of the filter unit to thereby exert a suction force on pore entrained debris particles in a direction away from the vibrating working face until the particle debris has been dislodged and withdrawn from substantially all pores of the filter unit by the combined action of cavitation and suction forces.

14. The method of removing entrained particle debris from the minute pores of a porous object, which includes; immersing the porous object in a bath of cleaning fluid, placing the relatively flat working face of a vibrator assembly in closely adjacent relation to one surface of the porous object, vibrating the working face at high frequency and relatively small amplitude in a direction normal to said surface to thereby produce intense cavitation of a limited column of cleaning fluid which penetrates the adjacent pores of the object; establishing relative lateral movement between the vibrating working face of the vibrating assembly and the porous object while the working face is in close proximity to said surface of the porous object, to thereby subject progressive limited portions of the porous object to the intense cavitational action of limited columns of cleaning fluid which penetrate adjacent pores thereof; and substantially simultaneously applying cleaning fluid suction to the opposite surface of the porous object to thereby exert a suction force on pore entrained debris particles in a direction away from the vibrating working face of the vibrator assembly until the particle debris has been dislodged and withdrawn from substantially all pores of the object by the combined action of cavitational and suction forces.

15. The method of removing entrained particle debris from the minute pores of a porous filter unit, which includes; immersing the filter unit in a bath of cleaning fluid, placing the relatively flat working face of a vibrator assembly in closely adjacent relation to one surface of the filter unit, vibrating the working face at high frequency and relatively small amplitude in a direction normal to said surface to thereby produce intense cavitation of a limited column of cleaning fluid which penetrates the adjacent pores of the filter unit; establishing relative lateral movement between the vibrating working face of the vibrator assembly and the filter unit while the working face continues to be maintained in close proximity to said surface of the filter unit, to thereby subject progressive limited portions of the filter unit to the intense cavitational action of limited columns of cleaning fluid which penetrate adjacent pores of the filter unit; and substantially simultaneously applying cleaning fluid suction to the opposite exterior surface of the filter unit to thereby exert a suction force on pore entrained debris particles in a direction away from the vibrating working face of the vibrator assembly until the particle debris has been dislodged and withdrawn from substantially all pores of the filter unit by the combined action of cavitational and suction forces.

16. The method of removing entrained particle debris from the minute pores of a porous object, which includes; immersing the porous object in a bath of cleaning fluid, placing the relatively flat working face of a vibrator assembly in close proximity to one surface of the porous object, vibrating the working face at high frequency and relatively small amplitude in a direction normal to said surface to thereby produce intense cavitation of a limited column of cleaning fluid which penetrates the adjacent pores of the object; and during said cavitation, alternately applying cleaning fluid pressure to the opposite surface of the porous object to thereby exert pushing pressure against pore entrained debris particles in a direction towards the vibrating working face of the vibrating assembly and cleansing fluid suction to said opposite surface of the porous object to thereby exert a suction force on the pore entrained debris particles in a direction away from the vibrating working face of the vibrator assembly, and whereby particle debris is dislodged, expelled and withdrawn from substantially all the pores of the object by the combined action of cavitational forces and alternate pressure and suction forces.

17. The method of removing entrained particle debris from the minute pores of a porous filter unit, which includes; immersing the filter unit in a bath of cleaning fluid, placing the relatively flat working face of a vibrator assembly in close proximity to one exterior surface of the filter unit, vibrating the working face at high frequency and relatively small amplitude in a direction normal to said exterior surface to thereby produce intense cavitation of a limited column of cleaning fluid which penetrates the adjacent pores of the filter unit; and during said cavitation, alternately applying cleaning fluid pressure to the opposite exterior surface of the filter unit to thereby exert pushing pressure against pore entrained debris particles in a direction towards the vibrating working face of the vibrating assembly and cleansing fluid suction to said opposite exterior surface of the filter unit to thereby exert a suction force on the pore entrained debris particles in a direction away from the vibrating working face of the vibrator assembly, and whereby particle debris is dislodged, expelled and withdrawn from the pores of the filter unit by the combined action of cavitational forces and alternate pressure and suction forces.

18. The method of removing entrained particle debris from the minute pores of a porous object, which includes; immersing the porous object in a bath of cleaning fluid, placing the relatively flat working face of a vibrator assembly in close proximity to one exterior surface of the porous object, vibrating the working face at high frequency and relatively small amplitude in a direction normal to said exterior surface to thereby produce intense cavitation of a limited column of cleaning fluid which penetrates the adjacent pores of the object; establishing relative lateral movement between the vibrating working face of the vibrator assembly and the exterior surface of the porous object while the working face continues to be maintained in close proximity to the exterior surface thereof, to thereby subject progressive limited portions of the porous object to the intense cavitational action of limited columns of cleaning fluid which penetrate adjacent pores of the object; and during said cavitation, alternately applying cleaning fluid pressure to the opposite exterior surface of the porous object to thereby exert pushing pressure against pore entrained debris particles in a direction towards the vibrating working face of the vibrating assembly and cleaning fluid suction to said opposite exterior face of the porous object to thereby exert a suction force on the pore entrained debris particles in a direction away from the vibrating working face of the vibrator assembly, and whereby particle debris is dislodged, expelled and withdrawn from the pores of progressive portions of the filter unit by the combined action of cavitational forces and alternate pressure and suction forces.

19. The method of removing entrained particle debris from the minute pores of a porous filter unit to thereby cleanse the same for re-use, which includes; immersing the filter unit in a bath of cleaning fluid, placing the relatively flat working face of a vibrator assembly in close proximity to one exterior surface of the filter unit, vibrating the working face at high frequency and relatively small amplitude in a direction normal to said exterior surface to thereby produce intense cavitation of a limited column of cleaning fluid which penetrates the adjacent pores of the filter unit; establishing relative lateral movement between the vibrating working face of the vibrator assembly and the filter unit while the working face continues to be maintained in close proximity to the exterior surface of the filter unit, to thereby subject progressive limited portions of the filter unit to intense cavitational action of limited columns of cleaning fluid which penetrate adjacent pores of the filter unit; and during said cavitation, alternately applying cleaning fluid pressure to the opposite exterior surface of the filter unit to thereby exert pushing pressure against pore entrained debris particles in a direction towards the vibrating working face of the vibrating assembly and cleaning fluid suction to said opposite exterior face of the filter unit to thereby exert a suction force on the pore entrained debris particles in a direction away from the vibrating working face of the vibrator assembly, and whereby particle debris is dislodged, expelled and withdrawn from the pores of progressive portions of the filter unit by the combined action of cavitational forces and alternate pressure and suction forces.

20. The method of removing entrained particle debris from the minute pores of a porous filtering member, which includes; immersing the filtering member in a bath of cleaning fluid, placing the relatively flat working face of a vibrator assembly in close proximity to a surface of the filtering member, vibrating the working face at high frequency and relatively small amplitude in a direction normal to said surface to thereby produce intense cavitation of a limited column of cleaning fluid which penetrates the adjacent pores in the filtering member; establishing relative lateral movement between the vibrating working face of the vibrator assembly and said surface of the filtering member while the working face continues to be maintained in close proximity to said surface thereof to thereby subject progressive limited portions of the filtering member to the intense cavitational action of limited columns of cleaning fluid which penetrate adjacent pores in the filtering member; and during said cavitation, alternately applying a cleaning fluid pressure to the opposite surface of the filtering member to thereby exert pushing pressure against pore entrained debris particles in a direction towards the vibrating working face of the vibrator assembly, and then applying cleaning fluid suction to said opposite surface of the filtering member to thereby exert a suction force on the pore entrained debris particles in a direction away from the vibrating working face of the vibrator assembly, and whereby particle debris is dislodged, expelled and withdrawn from the pores of progressive portions of the filtering member by the combined action of cavitational forces and alternate pressure and suction forces.

21. The method of removing entrained particle debris from the minute pores of a porous tubular filter unit, which includes; immersing the tubular filter unit in a bath of cleaning fluid, placing the relatively flat working face of a vibrator assembly in close proximity to the exterior tubular surface of the tubular filter unit, vibrating the working face at high frequency and relatively small amplitude in a direction normal to said exterior surface to thereby produce intense cavitation of a limited column of cleaning fluid which penetrates the adjacent pores in the tubular wall of the filter unit; establishing relative lateral movement between the vibrating working face of the vibrator assembly and the tubular wall of the filter unit while the working face continues to be maintained in close proximity to the exterior tubular surface thereof to thereby subject progressive limited portions of the tubular wall of the filter unit to the intense cavitational action of limited columns of cleaning fluid which penetrate adjacent pores in the tubular wall of the filter unit; and during said cavitation, alternately applying cleaning fluid pressure to the interior of the tubular filter unit to thereby exert pushing pressure against pore entrained debris particles in a direction towards the exterior of the tubular filter unit, and then applying cleaning fluid suction to the interior of the tubular filter unit to thereby exert a suction force on the pore entrained debris particles in a direction towards the interior of the tubular filter unit, and whereby particle debris is dislodged, expelled and withdrawn from the pores of progressive tubular wall portions of the filter unit by the combined action of cavitational forces and alternate pressure and suction forces.

22. The method of removing particle debris lodged in the minute pores of a porus filter unit, which includes; immersing the filter unit in a bath of cleaning fluid, forcibly injecting cleaning fluid into the pores at one side of the filter unit to thereby faciliate an outward flow of debris laden cleaning fluid from the pores at the opposite side of the filter unit while simultaneously applying intense cavitational action to progressive localized columns of the cleaning fluid which penetrates the adjacent pores of the filter unit to thereby effectuate loosening and outward withdrawal of particle debris from said opposite side of the filter unit by the combined action of cavitational and pressure forces, then applying suction to said one side of the filter unit to facilitate a counter-flow of cleaning fluid through the pores of the filter unit while simultaneously applying intense cavitational action to progressive localized columns of the cleaning fluid which penetrate the adjacent pores of the filter unit to thereby effectuate inward withdrawal of remaining particle debris from the pores of the filter unit by the combined action of cavitational and suction forces.

23. The method of removing particle debris lodged in the minute pores of a porous tubular filter unit, which includes; immersing the tubular filter unit in a bath of cleaning fluid, forcibly injecting cleaning fluid into the tubular interior of the filter unit to thereby facilitate an outward flow of debris laden cleaning fluid through the minute pores in the tubular wall of the filter unit while simultaneously applying intense cavitational action to progressive localized columns of the cleaning fluid which penetrates the adjacent pores in the tubular wall of the filter unit to thereby effectuate loosening and outward withdrawal of particle debris from the tubular wall of the filter unit by the combined action of cavitational and pressure forces, then applying suction to the tubular interior of the filter unit to establish a counter-flow of cleaning fluid through the minute pores in the tubular wall of the filter unit while simultaneously applying intense cavitational action to progressive localized columns of the cleaning fluid which penetrate the adjacent pores in the tubular wall of the filter unit to thereby effectuate inward withdrawal of remaining particle debris from the tubular wall of the filter unit by the combined action of cavitational and suction forces.

24. The method of removing particle debris lodged in the minute pores of a corrugated filtering screen of extremely fine mesh, which includes; immersing the corrugated filtering screen in a bath of cleaning fluid, forcibly injecting cleaning fluid into the pores of the corrugated filtering screen to thereby facilitate an outward flow of debris laden cleaning fluid through the pores thereof while simultaneously applying intense cavitational action to progressive localized columns of the cleaning fluid which penetrates the adjacent pores of the corrugated filtering screen to thereby effectuate loosening and outward withdrawal of particle debris from the pores of the corrugated filtering screen by the combined action of cavitational and pressure forces, then applying suction to the pores of the corrugated filtering screen to establish a counter-flow of cleaning fluid through the pores thereof while simultaneously applying intense cavitational action to progressive localized columns of the cleaning fluid which penetrates the adjacent pores to thereby effectuate loosening and inward withdrawal of remaining particle debris from the pores of the corrugated filtering screen by the combined action of cavitational and suction forces.

25. The method of removing particle debris lodged in the minute pores of a tubular filter unit whose main filter element is in the form of a tubular wall composed of a corrugated filter screen of extremely fine mesh, which includes; immersing the tubular filter unit in a bath of cleaning fluid, forcibly injecting cleaning fluid into the tubular interior of the filter unit to thereby facilitate an outward flow of debris laden cleaning fluid through the minute pores in the tubular wall of the filter unit while simultaneously applying intense cavitational action to progressive localized columns of the cleaning fluid which penetrates the adjacent pores in the tubular wall of the filter unit to thereby effectuate loosening and outward withdrawal of particle debris from the tubular wall of the filter unit by the combined action of cavitational and pressure forces, then applying suction to the tubular interior of the filter unit to establish a counter-flow of cleaning fluid through the minute pores in the tubular wall of the filter unit while simultaneously applying intense cavitational action to progressive localized columns of the cleaning fluid which penetrate the adjacent pores in the tubular wall of the filter unit to thereby effectuate loosening and inward withdrawal of remaining particle debris from the tubular wall of the filter unit by the combined action of cavitational and suction forces.

26. Apparatus for removing particle debris from the cavities of an object to be cleaned, which includes; a vibrator assembly presenting a vibrator unit which includes a transducer section, a connecting body having one end thereof rigidly fixed to the adjacent end of the transducer section and whose opposite end presents a relatively flat working face, and means for energizing said transducer section to thereby cause said working face to longitudinally vibrate at high frequency and relatively small amplitude; a tank for containing a bath of cleaning fluid; means for supporting the object in the cleaning fluid bath with one surface thereof in close proximity to the working face of said vibrator unit to thereby subject the immediately adjacent cavity contained debris to the intense cavitation of a limited column of cleaning fluid which penetrates the adjacent cavities of the object when the working face is vibrated at high frequency; and means for applying cleaning fluid pressure to the opposite surface of the object in a manner to exert pushing pressure against the debris particles entrained in its cavities in a direction towards the working face of the vibrator unit.

27. Apparatus for removing entrained particle debris from the minute pores of a porous object, which includes; a vibrator assembly presenting a vibrator unit which includes a transducer section, a connecting body having one end thereof rigidly fixed to the adjacent end of the transducer section and whose other end presents a relatively flat working face, and means for energizing said transducer section to thereby cause said working face to longitudinally vibrate at high frequency and relatively small amplitude; a tank for containing a bath of cleaning fluid; means for supporting the porous object in the cleaning fluid bath with one surface thereof in close proximity to the working face of said vibrator unit to thereby subject the adjacent pore clogging debris to the intense cavitation of a limited column of cleaning fluid which penetrates the adjacent pores of the porous object when the working face is vibrated at high frequency; and means for applying cleaning fluid pressure to the opposite surface of the porous object in a manner to exert pushing pressure against the pore entrained debris particles in a direction towards the working face of the vibrator unit.

28. Apparatus for removing particle debris from the cavities of an object to be cleaned, which includes; a vibrator assembly presenting a vibrator unit which includes a transducer section, a connecting body having one end thereof rigidly fixed to the adjacent end of the transducer section and whose other end presents a relatively flat working face, and means for energizing said transducer section to thereby cause said working face to longitudinally vibrate at high frequency and relatively small amplitude; a tank for containing a bath of cleaning fluid; means for supporting the object in the cleaning fluid bath with one surface thereof in close proximity to the working face of said vibrator unit to thereby subject the adjacent cavity entrained debris to the intense cavitation of a limited column of cleaning fluid which penetrates the adjacent cavities of the object when the working face is vibrated at high frequency, and means for exerting cleaning fluid suction at the opposite surface of the object to thereby facilitate the withdrawal of particle debris from the cavities of the object.

29. Apparatus for removing entrained particle debris from the minute pores of a porous object, which includes; a vibrator assembly presenting a vibrator unit which includes a transducer section, a connecting body having one end thereof rigidly fixed to the adjacent end of the transducer section and whose other end presents a relatively flat working face, and means for energizing said transducer section to thereby cause said working face to longitudinally vibrate at high frequency and relatively small amplitude; a tank for containing a bath of cleaning fluid; means for supporting the porous object in the cleaning fluid bath with one surface thereof in close proximity to the working face of said vibrator unit to thereby subject the adjacent pore entrained debris to the intense cavitation of a limited column of cleaning fluid which penetrates the adjacent pores of the object when the working face is vibrated at high frequency; and means for exerting cleaning fluid suction at the opposite surface of the porous object to thereby facilitate the withdrawal of pore entrained particle debris from the object.

30. Apparatus for removing particle debris from the cavities of an object to be cleaned, which includes; a vibrator assembly presenting a vibrator unit which includes a magneto-strictive transducer section, a connecting body having one end thereof rigidly fixed to the adjacent end of the transducer section and whose other end presents a relatively flat working face, and means for establishing a high frequency alternating magnetic field in surrounding relation to said transducer section to thereby cause said working face to longitudinally vibrate at high frequency and relatively small amplitude; a tank for containing a bath of cleaning fluid; means for supporting the object in the cleaning fluid bath with one surface thereof in close proximity to the working face of said vibrator unit to thereby subject the adjacent cavity entrained debris to the intense cavitation of a limited column of cleaning fluid which penetrates the adjacent cavities of the object when the working face is vibrated at high frequency; means for applying cleaning fluid pressure to the opposite surface of the object in a manner to exert pushing pressure against the debris particles entrained in the cavities of the object in a direction towards the vibrator working face of the vibrator unit; and means for alternately exerting cleaning fluid suction at the opposite surface of the object to thereby facilitate the withdrawal of remaining particle debris from the cavities of the object in a direction away from the vibrator working face of the vibrator unit.

31. Apparatus for removing entrained particle debris from the minute pores of a porous filter unit, which includes; a vibrator assembly presenting a vibrator unit which includes a magnetostrictive transducer section, a connecting body having one end thereof rigidly fixed to the adjacent end of the transducer section and whose other end presents a relatively flat working face, and means for establishing a high frequency alternating magnetic field in surrounding relation to said transducer section to thereby cause said working face to longitudinally vibrate at high frequency and relatively small amplitude; a tank for containing a bath of cleaning fluid; means for adjustably supporting the filter unit in the cleaning fluid bath while permitting lateral adjustment of the filter unit to place progressive surface portions of the filter unit in close proximity to the vibratory working face of the vibrator unit and thereby subject the adjacent pore entrained debris to the intense cavitation of progressive columns of cleaning fluid which penetrate the pores in progressively adjacent portions of the filter unit when the working face is vibrated at high frequency; and means for applying cleaning fluid pressure to the opposite surface of the filter unit in a manner to exert pushing pressure against the pore entrained debris particles in a direction towards the vibratory working face of the vibratory unit.

32. Apparatus for removing entrained particle debris from the minute pores of a porous filter unit, which includes; a vibrator assembly presenting a vibrator unit which includes a magnetostrictive transducer section, a connecting body having one end thereof rigidly fixed to the adjacent end of the transducer section and whose other end presents a relatively flat working face, and means for establishing a high frequency alternating magnetic field in surrounding relation to said transducer section to thereby cause said working face to longitudinally vibrate at high frequency and relatively small amplitude; a tank for containing a bath of cleaning fluid; means for adjustably supporting the filter unit in the cleaning fluid bath while permitting lateral adjustment of the filter unit to place progressive surface portions of the filter unit in close proximity to the vibratory working face of the vibrator unit and thereby subject the adjacent pore entrained debris to the intense cavitation of progressive columns of cleaning fluid which penetrate the pores in progressive adjacent portions of the filter unit when the working face is vibrated at high frequency; means for applying cleaning fluid pressure to the opposite surface of the filter unit in a manner to exert pushing pressure against the pore entrained debris particles in a direction towards the vibratory working face of the vibrator unit; and means for alternately exerting cleaning fluid suction at the opposite surface of the filter unit to thereby facilitate the withdrawal of remaining pore entrained particle debris from the filter unit in a direction away from the vibratory working face of the virator unit.

33. Apparatus for removing entrained particle debris from the cavities of an object to be cleaned, which includes; a vibrator assembly which includes a vibrator unit presenting a relatively flat working face, and means for energizing said vibrator unit to longitudinally vibrate its working face at high frequency and relatively small amplitude; a tank for containing a bath of cleaning fluid; means for supporting the object to be cleaned in the cleaning fluid bath with one side thereof in close proximity to the working face of said vibrator unit to thereby subject the adjacent cavity entrained debris to the intense cavitation of a limited column of cleaning fluid which penetrates the adjacent cavities of the object when said working face is vibrated at high frequency, said object supporting means including an adjustable support member and an adjustable object supporting adapter mounted on said support member; and means for conducting cleaning fluid to and from said object supporting adapter.

34. The method of treating a fluid laden porous material which includes: placing the relatively flat working face of a vibrator assembly in closely adjacent relation to one surface of the fluid laden porous material, vibrating the working face at high frequency and relatively small amplitude in a direction substantially normal to said surface to thereby produce intense cavitation of a limited column of the fluid with which the porous material is laden and which penetrates the pores of the material; establishing relative lateral movement between the vibrating working face of the vibrator assembly and the adjacent surface of the fluid laden porous material while the working face is maintained in close proximity to the adjacent surface of the porous material to thereby subject progressive limited portions of the porous material to the intense cavitational action of limited columns of fluid with which the porous material is laden and which penetrates the adjacent pores of the material; and substantially simultaneously applying a differential pressure to the opposite surfaces of the fluid laden porous material to thereby exert an extracting force on the pore entrained fluid in a direction substantially normal to the working face of the vibrator assembly with resultant extraction of fluid from the porous material by the combined action of cavitational and differential pressure forces.

35. Apparatus for removing entrained particle debris from the minute pores of a porous filter unit, which includes; a vibrator assembly which includes a vibrator unit presenting a relatively flat working face, and means for energizing said vibrator unit to longitudinally vibrate its working face at high frequency and relatively small amplitude; a tank for containing a bath of cleaning fluid; means for supporting the filter unit in the cleaning fluid bath with one side thereof in close proximity to the working face of said vibrator unit to thereby subject the adjacent pore entrained debris to the intense cavitation of a limited column of cleaning fluid which penetrates the adjacent pores of the filter unit when the working face is vibrated at high frequency, said filter unit supporting means including a cleaning fluid flow tube, and an adapter mounted on said flow tube and designed to support the immersed filter unit in communication with said tube; a cleaning fluid flow system connected to said filter unit supporting tube, and adjustable means associated with said cleaning fluid flow system operative when in one position of adjustment to apply cleaning fluid pressure to the filter unit in a manner to exert pushing pressure against the pore entrained debris particles in a direction towards the vibratory working face of the vibrator unit, and operative when in another position of adjustment to apply cleaning fluid suction to the filter unit to thereby facilitate the withdrawal of remaining pore entrained particle debris from the filter unit in a direction away from the vibratory working face of the vibrator unit.

36. Apparatus for removing entrained particle debris from the minute pores of a porous filter unit, which includes; a vibrator assembly which includes a vibrator unit presenting a relatively flat working face, and means for energizing said vibrator unit to longitudinally vibrate its working face at high frequency and relatively small amplitude; a tank for containing a bath of cleaning fluid; means for supporting the filter unit in the cleaning fluid bath with one side thereof in close proximity to the working face of said vibrator unit to thereby subject the adjacent pore entrained debris to the intense cavitation of a limited column of cleaning fluid which penetrates the adjacent pores of the filter unit when the working face is vibrated at high frequency, said filter unit supporting means including a cleaning fluid flow tube, and an adapter slidably mounted on said flow tube and designed to support the immersed filter unit in communication with said tube; and a cleaning fluid flow system connected to said tube and operative to drive cleaning fluid under pressure into, and alternately under suction from, the pores of the adapter supported filter unit.

37. The method of extracting fluid from a fluid laden porous material which includes; placing the relatively flat working face of a vibrator assembly in closely adjacent relation to one surface of the fluid laden porous material, vibrating the working face at high frequency and relatively small amplitude in a direction substantially normal to said surface to thereby produce intense cavitation of a limited column of the fluid with which the porous material is laden and which penetrates the pores of the material; advancing the fluid laden porous material in a direction substantially normal to the working face of the vibrator assembly while the working face is maintained in close proximity to the adjacent surface of the fluid laden porous material to thereby subject progressive limited portions of the porous material to the intense cavitational action of limited columns of fluid with which the porous material is laden and which penetrate the adjacent pores of the material; and substantially simultaneously applying a differential pressure to the opposite surfaces of the fluid laden porous material to thereby exert an extracting force on the pore entrained fluid in a direction substantially normal to the working face of the vibrator assembly with resultant extraction of the fluid from the porous material by the combined action of cavitational and differential pressure forces.

38. The method of removing foreign matter from porous material which includes; impregnating the pores of the porous material with a cleaning fluid, placing the relatively flat working face of a vibrator assembly in closely adjacent relation to one surface of the fluid impregnated porous material, vibrating the working face at high frequency and relatively small amplitude in a direction substantially normal to said surface to thereby produce intense cavitation of a limited column of the fluid with which the porous material is impregnated and which penetrates the pores of the material; establishing relative lateral movement between the vibrating working face of the vibrator assembly and the adjacent surface of the fluid impregnated porous material while the working face is maintained in close proximity to the adjacent surface of the porous material to thereby subject progressive limited portions of the porous material to the intense cavitational action of limited columns of cleaning fluid with which the porous material is impregnated and which penetrates the adjacent pores of the material; and substantially simultaneously applying a differential pressure to the opposite surfaces of the fluid impregnated porous material to thereby exert an extracting force on the pore entrained fluid and foreign matter in a direction substantially normal to the working face of the vibrator assembly with resultant extraction of the fluid and foreign matter from the porous material by the combined action of cavitational and differential pressure forces.

39. The method of cleaning porous material and removing foreign matter therefrom which includes; impregnating the porous material to be cleaned with a cleaning fluid, placing the relatively flat working face of a vibrator assembly in closely adjacent relation to one side of the fluid impregnated porous material, vibrating the working face at high frequency and relatively small amplitude in a direction substantially normal to said one side of the fluid impregnated porous material to thereby produce intense cavitation of a limited column of the cleaning fluid with which the porous material is impregnated and which penetrates the pores of the material; moving the fluid impregnated porous material in a direction substantially normal to the working face of the vibrator assembly while the working face is maintained in close proximity to the adjacent side of the porous material to thereby subject progressive limited portions of the porous material to the intense cavitational action of limited columns of fluid with which the porous material is impregnated and which penetrates the adjacent pores of the material; and substantially simultaneously applying a differential pressure to the opposite sides of the fluid impregnated porous material to thereby exert an extracting force on the pore entrained fluid and foreign matter in a direction substantially normal to the working face of the vibrator assembly with resultant extraction of the fluid and foreign matter from the porous material by the combined action of cavitational and differential pressure forces.

40. The method of cleaning and extracting foreign matter from porous material which includes; impregnating the pores of the porous material with a cleaning fluid, placing the relatively flat working face of a vibrator assembly in closely adjacent relation to one surface of the fluid impregnated porous material, vibrating the working face at high frequency and relatively small amplitude in a direction substantially normal to said surface to thereby produce intense cavitation of a limited column of the cleaning fluid with which the porous material is impregnated and which penetrates the pores of the material; moving the fluid impregnated porous material in a direction substantially normal to the working face of the vibrator assembly while the working face is maintained in close proximity to the adjacent surface of the porous material to thereby subject progressive limited portions of the porous material to the intense cavitational action of limited columns of cleaning fluid with which the porous material is impregnated and which penetrates the adjacent pores of the material; and substantially simultaneously applying a differential pressure to the opposite surfaces of the fluid impregnated porous material in a direction substantially normal to the direction of movement of the fluid impregnated porous material to thereby extract fluid and foreign matter from the porous material by the combined action of cavitational and differential pressure forces.

References Cited in the file of this patent

UNITED STATES PATENTS

| | | |
|---|---|---|
| 923,215 | Thomas | June 1, 1909 |
| 963,767 | Jarvis | July 12, 1910 |
| 1,218,154 | Zahm | Mar. 6, 1917 |
| 2,345,935 | Hassler | Apr. 4, 1944 |
| 2,530,224 | Camp | Nov. 14, 1950 |
| 2,632,858 | Calosi | Mar. 24, 1953 |
| 2,828,231 | Henry | Mar. 25, 1958 |
| 2,831,785 | Kearney | Apr. 22, 1958 |
| 2,894,519 | Gregg | July 14, 1959 |
| 2,981,268 | McAuley | Apr. 25, 1961 |